(12) United States Patent
Uematsu et al.

(10) Patent No.: US 8,463,511 B2
(45) Date of Patent: Jun. 11, 2013

(54) TRACTION CONTROL DEVICE

(75) Inventors: Koji Uematsu, Oyama (JP); Kazuhiro Hatake, Kanagawa (JP); Yuya Kusumoto, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/140,664

(22) PCT Filed: Dec. 25, 2009

(86) PCT No.: PCT/JP2009/071582
§ 371 (c)(1),
(2), (4) Date: Jun. 17, 2011

(87) PCT Pub. No.: WO2010/074226
PCT Pub. Date: Jul. 1, 2010

(65) Prior Publication Data
US 2011/0251762 A1 Oct. 13, 2011

(30) Foreign Application Priority Data

Dec. 26, 2008 (JP) ................... 2008-334066
Dec. 26, 2008 (JP) ................... 2008-334067
Dec. 26, 2008 (JP) ................... 2008-334068

(51) Int. Cl.
*G06F 7/70* (2006.01)
(52) U.S. Cl.
USPC .............. 701/50; 701/48; 701/70; 701/78; 701/83
(58) Field of Classification Search
USPC ................. 701/50, 48, 70, 78, 83
See application file for complete search history.

(56) References Cited

U.S. PATENT DOCUMENTS

| 4,912,744 A | 3/1990 | Hurst |
| 5,073,865 A | 12/1991 | Togai et al. |

(Continued)

FOREIGN PATENT DOCUMENTS

| EP | 1 396 402 A1 | 3/2004 |
| GB | 2 270 354 A | 3/1994 |

(Continued)

OTHER PUBLICATIONS

International Search Report from International Application No. PCT/JP2009/071581, dated Feb. 23, 2010, 2 pages.

(Continued)

*Primary Examiner* — James Trammell
*Assistant Examiner* — Truc M Do
(74) *Attorney, Agent, or Firm* — Fish & Richardson P.C.

(57) ABSTRACT

An object of the invention is to provide a traction control device capable of preventing a reduction in acceleration. A traction control device of the invention includes a braking mechanism controller that controls a braking mechanism. The braking mechanism controller includes: a target brake torque calculating section that calculates a target brake torque to each of wheels based on the rotation speed of the wheel and an estimated vehicle speed; a target brake torque determining section that determines whether or not the target brake torque reaches or exceeds a per-stored threshold; a reference wheel determining section that selects a reference wheel used as a reference for controlling the braking mechanism based on the target brake torque to each of the wheels; and a target brake torque reducing section that reduces the target brake torque in accordance with a difference between the target brake torque to the reference wheel and the threshold when the target brake torque to one of the wheels reaches or exceeds the threshold.

4 Claims, 12 Drawing Sheets

U.S. PATENT DOCUMENTS

| | | | |
|---|---|---|---|
| 5,241,479 A | | 8/1993 | Matsuda et al. |
| 5,320,422 A | * | 6/1994 | Tsuyama et al. ............. 303/141 |
| 5,353,225 A | | 10/1994 | Tsuyama et al. |
| 5,428,539 A | | 6/1995 | Kawamura et al. |
| 5,456,641 A | | 10/1995 | Sawase |
| 5,535,124 A | | 7/1996 | Hosseini et al. |
| 5,636,121 A | * | 6/1997 | Tsuyama et al. ............... 701/70 |
| 5,913,377 A | | 6/1999 | Ota et al. |
| 5,944,392 A | | 8/1999 | Tachihata et al. |
| 5,957,550 A | | 9/1999 | Watanabe |
| 6,122,585 A | * | 9/2000 | Ono et al. .................. 701/71 |
| 6,185,920 B1 | | 2/2001 | Oxley |
| 6,205,379 B1 | * | 3/2001 | Morisawa et al. ............ 701/22 |
| 6,208,929 B1 | | 3/2001 | Matsuno et al. |
| 6,269,297 B1 | | 7/2001 | Hosomi et al. |
| 6,463,378 B2 | * | 10/2002 | Nishio ............................ 701/70 |
| 6,568,763 B2 | | 5/2003 | Uematsu et al. |
| 6,575,023 B2 | | 6/2003 | Ohashi et al. |
| 6,584,399 B2 | * | 6/2003 | Koibuchi ...................... 701/90 |
| 6,598,945 B2 | * | 7/2003 | Shimada et al. ............. 303/152 |
| 6,631,320 B1 | | 10/2003 | Holt et al. |
| 6,671,598 B2 | | 12/2003 | Laurent |
| 6,719,082 B2 | | 4/2004 | Uematsu et al. |
| 6,913,326 B1 | * | 7/2005 | Ohkubo et al. ................. 303/11 |
| 6,923,514 B1 | * | 8/2005 | Spieker et al. ................ 303/199 |
| 6,932,180 B2 | | 8/2005 | Matsuno et al. |
| 6,959,241 B2 | | 10/2005 | Itow et al. |
| 7,016,776 B2 | | 3/2006 | Elie et al. |
| 7,276,014 B2 | | 10/2007 | Goto et al. |
| 7,398,145 B2 | * | 7/2008 | Kato et al. ...................... 701/80 |
| 7,444,222 B2 | | 10/2008 | Villella et al. |
| 7,455,142 B2 | | 11/2008 | Post, II |
| 7,562,947 B2 | | 7/2009 | Katada et al. |
| 7,770,681 B2 | | 8/2010 | Marathe et al. |
| 7,979,189 B2 | * | 7/2011 | Nihei ............................. 701/69 |
| 2001/0003805 A1 | * | 6/2001 | Koibuchi ........................ 701/9 |
| 2001/0013439 A1 | | 8/2001 | Irie |
| 2001/0027144 A1 | | 10/2001 | Murakami et al. |
| 2002/0007243 A1 | | 1/2002 | Yamaguchi |
| 2002/0010535 A1 | * | 1/2002 | Nishio ............................ 701/70 |
| 2002/0033292 A1 | | 3/2002 | Uematsu et al. |
| 2002/0047300 A1 | | 4/2002 | Uematsu et al. |
| 2003/0089547 A1 | | 5/2003 | Schenkel |
| 2003/0141128 A1 | | 7/2003 | Hessmert et al. |
| 2003/0149515 A1 | * | 8/2003 | Hessmert et al. ............... 701/29 |
| 2003/0150660 A1 | | 8/2003 | Ohtsu |
| 2004/0046448 A1 | * | 3/2004 | Brown ......................... 303/152 |
| 2004/0088103 A1 | | 5/2004 | Itow et al. |
| 2005/0055149 A1 | * | 3/2005 | Kato et al. ...................... 701/80 |
| 2005/0251316 A1 | * | 11/2005 | Kato et al. ...................... 701/70 |
| 2006/0015239 A1 | * | 1/2006 | Higuchi .......................... 701/72 |
| 2007/0155404 A1 | | 7/2007 | Yamane et al. |
| 2008/0120003 A1 | * | 5/2008 | Nihei ............................. 701/69 |
| 2008/0177495 A1 | | 7/2008 | Gold |
| 2011/0035130 A1 | | 2/2011 | Noguchi et al. |
| 2011/0246031 A1 | | 10/2011 | Uematsu et al. |
| 2011/0257847 A1 | | 10/2011 | Uematsu et al. |
| 2011/0257851 A1 | | 10/2011 | Uematsu et al. |
| 2011/0257861 A1 | | 10/2011 | Uematsu et al. |
| 2011/0270497 A1 | | 11/2011 | Uematsu et al. |
| 2012/0041651 A1 | | 2/2012 | Uematsu et al. |

FOREIGN PATENT DOCUMENTS

| | | |
|---|---|---|
| JP | S59-093560 A | 5/1984 |
| JP | S62-196442 A | 8/1987 |
| JP | S64-030866 A | 2/1989 |
| JP | H01-145242 A | 6/1989 |
| JP | H02-038172 A | 2/1990 |
| JP | H02-095927 A | 4/1990 |
| JP | H02-114052 A | 4/1990 |
| JP | H03-132461 A | 6/1991 |
| JP | H04-55158 A | 2/1992 |
| JP | H05-016686 A | 1/1993 |
| JP | H05-187284 A | 7/1993 |
| JP | H08-014075 A | 1/1996 |
| JP | H08-258588 A | 10/1996 |
| JP | H09-086367 A | 3/1997 |
| JP | H09-290729 A | 11/1997 |
| JP | H10-029524 A | 2/1998 |
| JP | H10-230837 A | 9/1998 |
| JP | H11-115719 A | 4/1999 |
| JP | 2000-344082 A | 12/2000 |
| JP | 2000-344084 A | 12/2000 |
| JP | 2001-082199 A | 3/2001 |
| JP | 2001-122099 A | 5/2001 |
| JP | 2001-219838 A | 8/2001 |
| JP | 2001-277896 A | 10/2001 |
| JP | 2002-029401 A | 1/2002 |
| JP | 2002-029402 A | 1/2002 |
| JP | 2002-087095 A | 3/2002 |
| JP | 2003-104186 A | 4/2003 |
| JP | 2003-237398 A | 8/2003 |
| JP | 2004-175347 A | 6/2004 |
| JP | 2004-517314 A | 6/2004 |
| WO | 02/49896 A1 | 6/2002 |
| WO | 2010-074225 A1 | 7/2010 |
| WO | 2010/074227 A1 | 7/2010 |
| WO | 2010/079704 A1 | 7/2010 |
| WO | 2010/079705 A1 | 7/2010 |

OTHER PUBLICATIONS

International Search Report from International Application No. PCT/JP2009/071583, dated Feb. 9, 2010, 1 page.

International Search Report from International Application No. PCT/JP2009/071584, dated Feb. 9, 2010, 2 pages.

International Search Report from International Application No. PCT/JP2009/071585, dated Apr. 13, 2010, 2 pages.

Non-final Office Action dated Feb. 16, 2012 in U.S. Appl. No. 13/175,107, 16 pages.

Notice of Reason(s) for Rejection issued Mar. 13, 2012 in Japanese Patent Application No. JP 2010-545726, including English Translation, 5 pages.

Supplementary European Search Report received Jan. 7, 2013 (mailed Nov. 16, 2012) from European Application No. 09 83 5022, 4 pages.

* cited by examiner

FIG. 4

TRACTION CONTROL DEVICE

CROSS REFERENCE TO RELATED APPLICATIONS

This application claims priority to Application No. PCT/JP2009/071582 filed on Dec. 25, 2009, which application claims priority to Japanese Application No. 2008-334066 filed on Dec. 26, 2008, Japanese Application No. 2008-334067 filed on Dec. 26, 2008 and Japanese Application No. 2008-334068 filed on Dec. 26, 2008. The entire contents of the above applications are incorporated herein by reference in their entireties.

TECHNICAL FIELD

The present invention relates to a control device for controlling a driving force of a travelling vehicle. In particular, the present invention relates to a traction control device of a construction machine capable of controlling a braking mechanism provided to each wheel.

BACKGROUND ART

Construction machines are frequently used by its nature in a place whose road surface is in a bad condition as compared with general vehicles. However, on a soft ground such as a mine or a construction site, since positional differences between the wheels lead to different friction coefficients between the wheels and the road surface, even the construction machines suffer from the slip of part of the driving wheels, so that a driving torque cannot be transmitted to the other driving wheels. In such a case, most of engine output is used to drive the slipping driving wheel or wheels, so that a sufficient amount of the driving force cannot be transmitted to the road surface, thereby reducing acceleration. In view of the above, it is required to control the driving torque to each wheel in accordance with a road surface condition so as to change the amount of the driving force transmitted to the road surface from the wheel to be suitable for the road surface.

As a device for controlling the driving force to each wheel of the construction machines, there has been known a traction control (hereinafter referred to as TCS) device that automatically applies brake to each wheel, thereby adjusting a driving torque to the wheel (see, for instance, Patent Literature 1).

Generally, the TCS device detects the rotation speeds of wheels and estimates the vehicle speed of a construction machine from the detected rotation speeds. The TCS device finds the slip condition of each wheel with reference to the estimated vehicle speed and the rotation speed of the wheel and applies brake to the wheel in accordance with an excess of an actual slip ratio relative to a target slip ratio.

CITATION LIST

Patent Literature

Patent Literature 1: JP-A-2004-175347

SUMMARY OF THE INVENTION

Problems to be Solved by the Invention

In a construction machine having a driven wheel, the rotation speed of the driven wheel substantially corresponds to an actual vehicle speed, so that the vehicle speed can be highly accurately estimated from the rotation speed of the driven wheel. Contrarily, in an all-wheel drive construction machine, a rotation speed corresponding to the vehicle speed cannot be obtained when all the wheels slip, so that an error may occur in estimation of the vehicle speed. Since the TCS device applies brake to each wheel in accordance with the estimated vehicle speed and the rotation speed of the wheel, an error in the estimated vehicle speed may result in a brake torque out of an optimum range applied by the TCS device. Specifically, when the estimated vehicle speed is lower than the actual vehicle speed, the TCS device understands that the wheel or wheels badly slip, so that an excessive brake may be applied to reduce the acceleration, which may annoy the driver.

On a soft road, travel resistance is significantly changed due to sinking of the wheel or wheels into the road surface, so that the acceleration during travelling tends to be reduced under the influence of the travel resistance irrespective of the occurrence of an error in the estimation of the vehicle speed or a friction coefficient against the road surface. Thus, a slip ratio for a soft road is set high as compared with one for any other road surface so that soil or the like is dug out of the road surface, thereby reducing the travel resistance and consequently improving the acceleration. A conventional TCS device, however, sets the target slip ratio in consideration of not only a soft road but also any other road surface, so that it is difficult to prevent a reduction in the acceleration in the latter case.

An object of the invention is to provide a traction control device capable of preventing a reduction in acceleration.

Means for Solving the Problems

According to an aspect of the invention, a traction control device of a construction machine including a braking mechanism provided to each of wheels, the traction control device controlling the braking mechanism, the traction control device includes: a rotation speed detector that detects a rotation speed of each of the wheels; a vehicle speed estimator that estimates a vehicle speed of the construction machine; and a braking mechanism controller that controls the braking mechanism, in which the braking mechanism controller includes: a control deviation calculating section that calculates a control deviation based on the rotation speed and the vehicle speed; a target brake torque calculating section that calculates a target brake torque applied to each of the wheels by the braking mechanism based on the control deviation; a target brake torque determining section that determines whether or not the target brake torque reaches or exceeds a pre-stored threshold; a reference wheel determining section that selects a reference wheel used as a reference for controlling the braking mechanism based on the target brake torque to each of the wheels; and a target brake torque reducing section that reduces the target brake torque in accordance with a difference between the target brake torque to the reference wheel and the threshold when the target brake torque to one of the wheels reaches or exceeds the threshold.

With the above arrangement, when the target brake torques to the wheels reach or exceed the pre-stored threshold, the traction control device reduces the target brake torques. Specifically, when the target brake torques reach a certain level, the traction control device simultaneously reduces the brake torques to the wheels. Since the brake torques applied to the wheels during the TCS control are reduced, it is possible to prevent a reduction in a driving force resulting from excessive application of brake. Thus, the driving force to each wheel can be increased if necessary, thereby preventing a reduction in the acceleration during travelling.

Further, in the traction control device of the above aspect, the target brake torques to the wheels are reduced in accordance with the difference between the target brake torque to the reference wheel and the pre-stored threshold. As a result, since the target brake torques to the wheels depend on the target brake torque to the reference wheel, a common reference to determine a torque reduction amount is used for the wheels. Since the target brake torques to the wheels are determined in accordance with the difference relative to the threshold, the target brake torques are prevented from being discontinuous before and after the reduction of the torques. Thus, it is possible to prevent a large variation in the reduction amounts of the target brake torques to the wheels and a discontinuous change in the target brake torques before and after the reduction of the torques. As a result, the brake torques to the wheels can be similarly and smoothly changed, thereby preventing a large abrupt change in the driving force to each wheel or an excessive increase in the driving force to each wheel relative to the other wheels. Consequently, a reduction in the acceleration can be prevented without annoying the driver.

In the traction control device, it is preferable that the reference wheel determining section select one of the wheels having the smallest target brake torque as the reference wheel.

With the above arrangement, the traction control device selects one of the wheels having the smallest target brake torque as the reference wheel. Thus, the difference between the target brake torque to the reference wheel and the threshold is calculated from the smallest value of the target brake torques to the wheels and the threshold. Specifically, such a difference, which is used as a reference to determine the reduction amount of the target brake torques, is set within a range of possible target brake torque values of the wheel that has the smallest target brake torque (i.e., the wheel that is smaller in slip amount than any other wheel and is stable relative to the road surface), and consequently, never exceeds the target brake torque value of this wheel. As a result, the brake torques to the wheels can be prevented from being unnecessarily reduced. Thus, while the travelling stability and course traceability of the construction machine are ensured at the time of the occurrence of a slip, a reduction in acceleration can be prevented.

In the traction control device, it is preferable that the threshold include a front-wheel threshold and a rear-wheel threshold of the target brake torques, the target brake torque determining section determine whether or not the target brake torques to both front ones of the wheels reach or exceed the front-wheel threshold and whether or not the target brake torques to both rear ones of the wheels reach or exceed the rear-wheel threshold, and the target brake torque reducing section reduce the target brake torques in accordance with a difference between the target brake torque to the reference wheel and the front-wheel threshold when the reference wheel is one of the front wheels and reduce the target brake torques in accordance with a difference between the target brake torque to the reference wheel and the rear-wheel threshold when the reference wheel is one of the rear wheels.

The "front and rear ones of the wheels" mean a front-side wheel and a rear-side wheel having a relative front-and-rear relationship, and thus, are not limited to the foremost and rearmost wheels.

With the above arrangement, the traction control device determines whether or not the target brake torques to both front wheels reach or exceed the front-wheel threshold and whether or not the target brake torques to both rear wheels reach or exceed the rear-wheel threshold. When the reference wheel is one of the front wheels, the traction control device reduces the target brake torques in accordance with the difference between the target brake torque to the reference wheel and the front-wheel threshold. When the reference wheel is one of the rear wheels, the traction control device reduces the target brake torques in accordance with the difference between the target brake torque to the reference wheel and the rear-wheel threshold. Thus, with the traction control device, even when the braking mechanisms used for the front wheels and the braking mechanisms used for the rear wheels have different characteristics, a timing for starting the reduction of the target brake torques and the torque reduction amount can be set in accordance with the characteristics of the braking mechanisms by changing the front-wheel threshold and the rear-wheel threshold. As a result, a reduction in the acceleration can be more effectively prevented.

In the traction control device, it is preferable that the braking mechanism controller further include a traction force estimating section that estimates a traction force between each of the wheels and a road surface based on the control deviation, and the target brake torque calculating section calculates the target brake torque to each of the wheels by using the estimated traction force.

With the above arrangement, the respective traction forces between the wheels and the road surface are estimated and then the estimated traction forces are used to calculate the target brake torques to the wheels, so that it is possible to calculate values of target brake torque suitable for the road surface. Thus, a reduction in the acceleration can be prevented, thereby maintaining the acceleration at a level suitable for the road surface.

BRIEF DESCRIPTION OF DRAWINGS

FIG. 4 is a functional block diagram showing a part of the structure of FIG. 3 in detail.

DESCRIPTION OF THE EXEMPLARY EMBODIMENT(S)

Exemplary embodiment(s) of the invention will be described below with reference to the attached drawings.

1. Structure of Dump Truck 1

Figure 1:
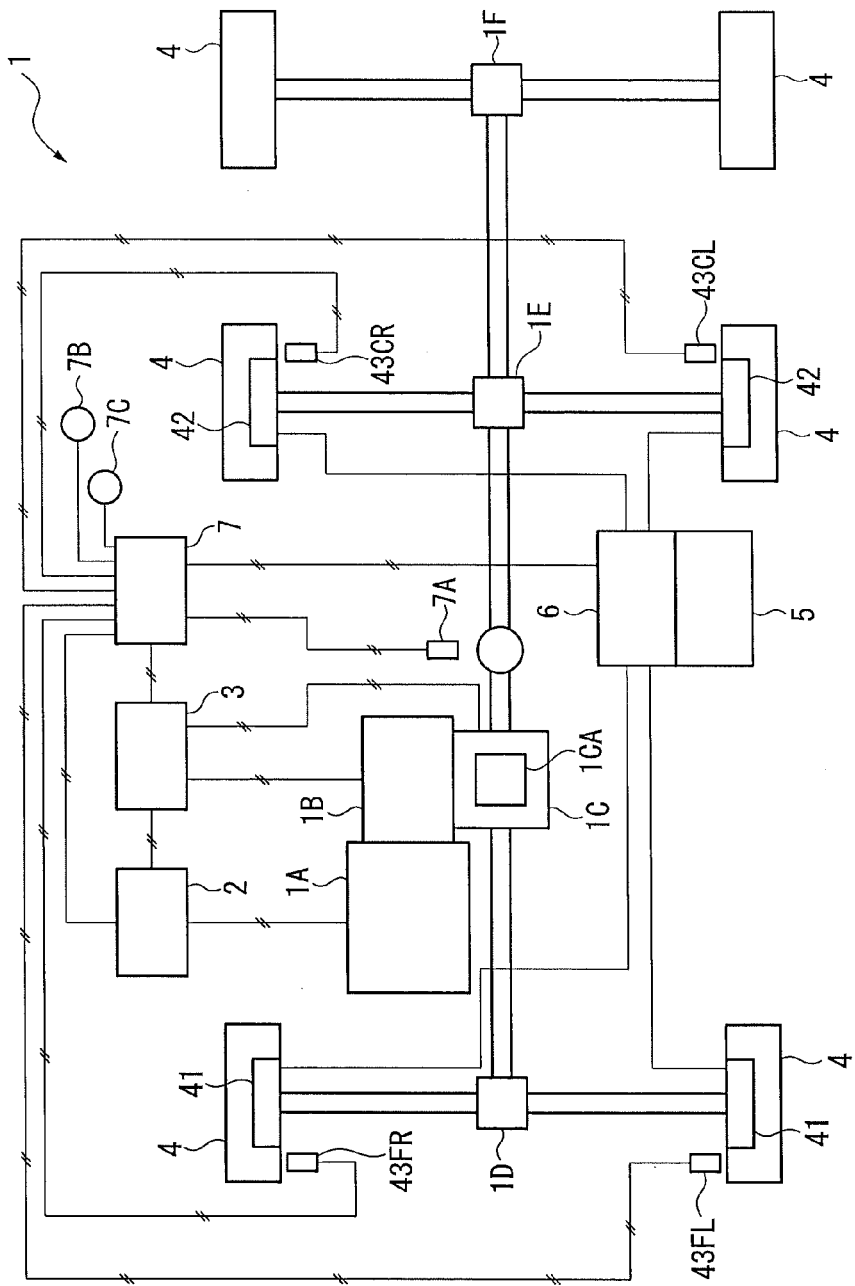
FIG. 1 is a schematic view showing the structure of a construction machine according to an exemplary embodiment of the invention.

FIG. 1 shows a dump truck 1 according to an exemplary embodiment of the invention. The dump truck 1 is an articulated truck that includes separate front and rear vehicle body frames. A vehicle body of the dump truck 1 includes an engine 1A, a transmission 1B, differential mechanisms 1C to 1F and a differential adjusting mechanism 1CA. The output of the engine 1A is controlled by an engine controller 2 and is transmitted to the transmission 1B. The transmission 1B includes a torque converter and a lockup mechanism (not shown). A transmission controller 3 performs speed change control and lockup control on the transmission 1B.

A rotary driving force transmitted from the engine 1A to the transmission 1B rotates all wheels 4 via the differential mechanisms 1C to 1F and is transmitted to the road surface.

In this exemplary embodiment, the differential mechanism 1C is provided with the differential adjusting mechanism 1CA, so that the differential of the differential mechanism 1C can be restrained by the differential adjusting mechanism 1CA. Further, the differential mechanisms 1D, 1E and 1F are configured to accept only the differentials of the right and left wheels. Thus, the differential mechanism 1E is in a so-called direct connection in which only the differentials of the right and left wheels are acceptable but not the differentials of the front and rear wheels.

The wheels 4 in the vehicle body are provided with front brakes 41 and center brakes 42. The front brakes 41 and the center brakes 42 are hydraulically connected to a brake hydraulic circuit 5 and a TCS control hydraulic circuit 6. A braking mechanism of the invention includes the front brakes 41, the center brakes 42, the brake hydraulic circuit 5 and the TCS control hydraulic circuit 6.

The wheels 4 are respectively provided with rotation speed sensors (i.e., rotation speed detectors) 43FL, 43FR, 43CL and 43CR (which are described later in detail) for detecting the rotation speeds of the wheels 4. A rotation speed signal detected by each of the rotation speed sensors 43FL, 43FR, 43CL and 43CR and an articulate angle (bending angle) between the front and rear vehicle body frames detected by an articulate angle sensor 7A are output to a TCS controller 7 as electric signals. A TCS system switch 7B for cancelling TCS control is electrically connected to the TCS controller 7.

The TCS controller 7 performs TCS control including TCS brake control for controlling the brake torques of the front brakes 41 and the center brakes 42 via the hydraulic circuits 5 and 6 and inter-axle differential control for adjusting the differential restraining force of the differential adjusting mechanism 1 CA. The TCS controller 7 also functions as a controller for retarder control. The TCS controller 7 performs the retarder control in accordance with an operation signal from a retarder control lever 7C used for setting a retarder speed.

2. Structure of Brake Hydraulic Circuit 5

Figure 2:
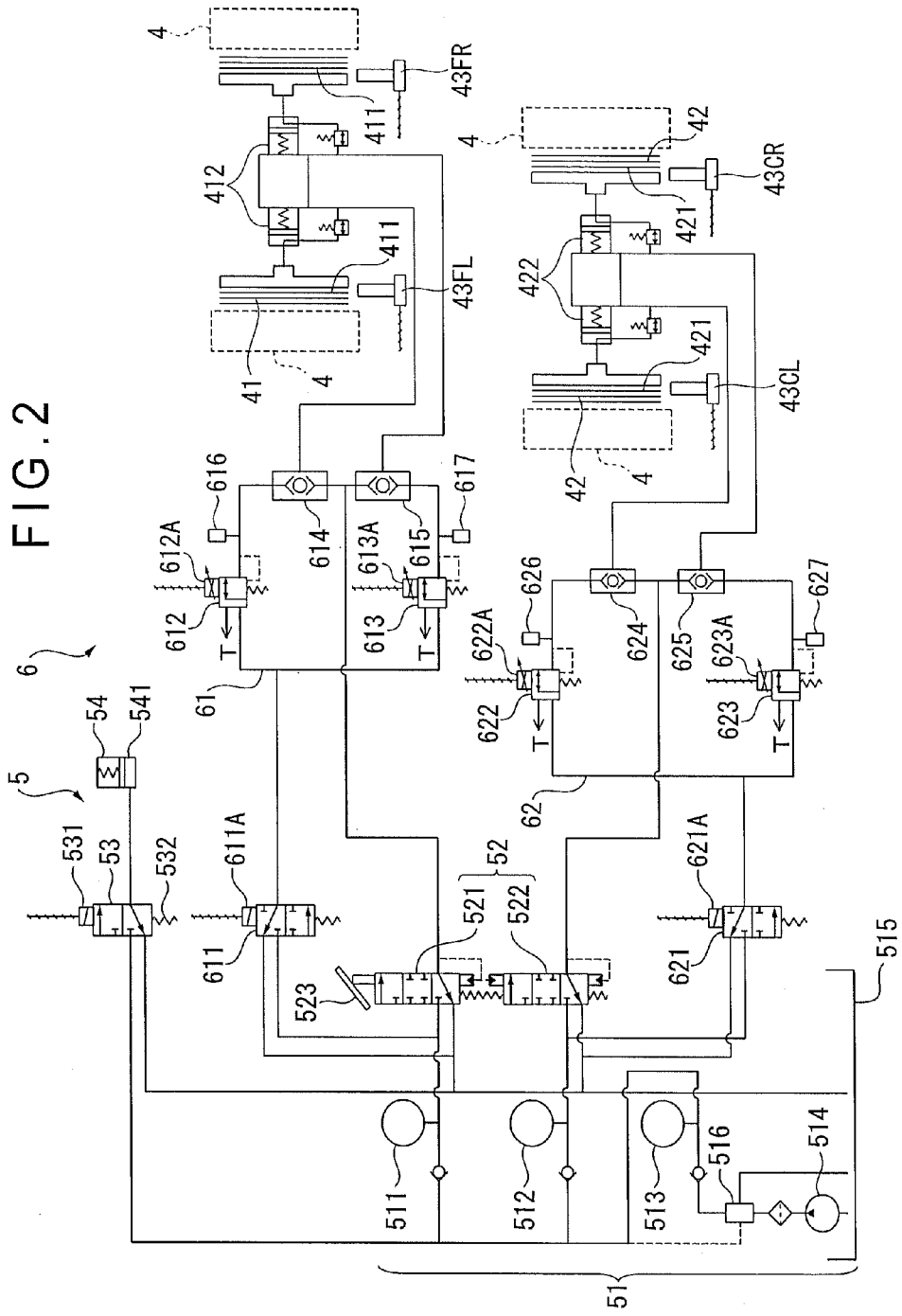
FIG. 2 is a hydraulic circuit diagram of the construction machine according to the exemplary embodiment.

FIG. 2 shows the brake hydraulic circuit 5 of the dump truck 1. In this exemplary embodiment, the front brakes 41 and the center brakes 42 include multi-disc brakes 411 and 421 and slack adjusters 412 and 422, respectively. The slack adjusters 412 and 422 are devices capable of automatically adjusting gaps resulting from abrasion of rotatable portions of the front brakes 41 and the center brakes 42. The slack adjusters 412 and 422 are hydraulically connected to the brake hydraulic circuit 5 and the TCS control hydraulic circuit 6.

All the front brakes 41 and the center brakes 42 are hydraulically controlled, so that when pressure oil is discharged from the brake hydraulic circuit 5, the discharged pressure oil is supplied to related portions of the front brakes 41 and the center brakes 42 via the TCS control hydraulic circuit 6, thereby hydraulically driving the related portions.

The brake hydraulic circuit 5 includes a hydraulic supply system 51, a foot brake valve 52 and a parking brake valve 53.

The hydraulic supply system 51 includes a plurality of hydraulic accumulators 511, 512 and 513 as hydraulic sources, a hydraulic pump 514 and a reservoir 515. Pressure oil is supplied from the hydraulic accumulators 511, 512 and 513 to the front brakes 41 and the center brakes 42 via the TCS control hydraulic circuit 6, thereby braking the wheels 4.

Each of the hydraulic accumulators 511, 512 and 513 receives the pressure oil in the reservoir 515, the pressure of which is boosted with the assistance of the hydraulic pump 514 driven by the engine 1A (driving source), to accumulate a predetermined pressure. When the predetermined pressure is obtained, an unload device 516 disposed between the hydraulic pump 514 and the hydraulic accumulator 513 unloads the pressure oil from the hydraulic pump 514.

The foot brake valve 52 includes a front brake valve 521 and a center brake valve 522. When a brake pedal 523 is operated, the front brake valve 521 and the center brake valve 522 respectively supply the pressure oil of the hydraulic accumulators 511 and 512 to the front brakes 41 and the center brakes 42 for braking.

Specifically, when the brake pedal 523 is operated, the position of the spool of the front brake valve 521 is shifted and the pressure oil of the hydraulic accumulator 511 is discharged from the front brake valve 521. The pressure oil is supplied to the front brakes 41 via a front hydraulic circuit 61 in the TCS control hydraulic circuit 6 to effect the braking of the front brakes 41. The pressure oil discharged from the front brake valve 521 acts on the right and left front brakes 41 with a substantially equal pressure via shuttle valves 614 and 615. Thus, braking with an equal braking force is performed on the left and right sides.

Simultaneously, the position of the spool of the center brake valve 522 is shifted, so that the pressure oil of the hydraulic accumulator 512 is discharged from the center brake valve 522. The pressure oil is supplied to the center brake 42 via a center hydraulic circuit 62 to effect the braking of the center brakes 42. The pressure oil discharged from the center brake valve 522 acts on the right and left center brakes 42 with a substantially equal pressure via shuttle valves 624 and 625, so that braking with an equal braking force is performed on the left and right sides, in the same manner as the braking on the front wheels.

The parking brake valve 53 is a valve for controlling a parking brake 54. The parking brake valve 53 includes a solenoid 531 and a spring 532. When a parking switch disposed in an operation room (not shown) is switched to a parking position, and thus, the position of the parking brake valve 53 is shifted with the assistance of the solenoid 531, the parking brake valve 53 directs pressure oil in a cylinder chamber 541 of the parking brake 54 back to the reservoir 515 of the hydraulic supply system 51, thereby reducing a parking brake pressure to zero. As a result, when the vehicle is parked, braking is maintained by the spring force of the parking brake 54.

When the vehicle travels, the parking switch (not shown) is switched to a travel position, and thus, the position of the parking brake valve 53 is shifted. As a result, the pressure oil of the hydraulic accumulator 513 is supplied to the cylinder chamber 541 of the parking brake 54 to increase the parking brake pressure. Thus, when the vehicle travels, the vehicle is released from the brake applied by the parking brake 54 to be movable. As briefly shown in FIG. 2, the parking brake 54 is provided in parallel with the front brakes 41 or the center brakes 42, or is provided to a brake attached to a drive shaft that transmits a driving force.

3. Structure of TCS Control Hydraulic Circuit 6

As shown in FIG. 2, the TCS control hydraulic circuit 6 is disposed in the middle of a hydraulic circuit extending from the brake hydraulic circuit 5 to the front brakes 41 and the center brakes 42. The TCS control hydraulic circuit 6 includes the front hydraulic circuit 61 and the center hydraulic circuit 62.

The front hydraulic circuit 61 is a hydraulic circuit configured to perform the TCS brake control on the front brakes 41. The front hydraulic circuit 61 includes a front TCS switching valve 611, two solenoid proportional control valves 612 and 613, the two shuttle valves 614 and 615 and pressure sensors 616 and 617.

The front TCS switching valve 611 is capable of switching whether or not to perform the TCS brake control on the front brakes 41 in response to an electric signal output from the TCS controller 7 to a solenoid 611A of the switching valve 611.

The solenoid proportional control valves 612 and 613 are respectively disposed on pipe lines branched in the middle of a pipe line having an end connected to the output side of the front TCS switching valve 611. The solenoid proportional control valves 612 and 613 are control valves configured to control the brake pressure of the front brakes 41 during the TCS brake control. The solenoid proportional control valve 612 is a valve configured to control pressure oil supply to the left one of the front brakes 41. The solenoid proportional control valve 613 is a valve configured to control pressure oil supply to the right one of the front brakes 41.

The opening degrees of the solenoid proportional control valves 612 and 613 are respectively adjusted by the solenoids 612A and 613A. After being depressurized and discharged, the hydraulic oil is partly directed back to the reservoir 515 of the above hydraulic supply system 51.

The shuttle valves 614 and 615 are disposed on the output sides of the solenoid proportional control valves 612 and 613, respectively. The shuttle valves 614 and 615 have, on one sides thereof, inputs being connected to outputs from the solenoid proportional control valve 612 and 613, and, on the other sides thereof, inputs being connected to each other via a pipe that communicates the inputs of the shuttle valves 614 and 615 to each other. In the middle of this pipe, an output pipe for the front brake valve 521 is connected.

The pressure sensors 616 and 617 are respectively disposed in the middles of pipes extending between the shuttle valves 614 and 615 and the solenoid proportional control valves 612 and 613. The pressure sensors 616 and 617 are configured to detect the brake pressure of the front brakes 41 and to output the detected signals to the TCS controller 7 as electric signals.

The center hydraulic circuit 62 is a hydraulic circuit configured to perform the TCS brake control on the center brakes 42. The center hydraulic circuit 62 includes a center TCS switching valve 621, two solenoid proportional control valves 622 and 623, the two shuttle valves 624 and 625, and pressure sensors 626 and 627 in the same manner as the front hydraulic circuit 61. The pressure sensors 616 and 617 may be respectively disposed in the middles of pipes extending between the shuttle valves 614 and 615 and the front brakes 41, and the pressure sensors 626 and 627 may be respectively disposed in the middles of pipes extending between the shuttle valves 624 and 625 and the center brakes 42.

The center TCS switching valve 621 is provided with a solenoid 621A. The center TCS switching valve 621 switches whether or not to perform TCS on the center brakes 42.

Likewise, the solenoid proportional control valves 622 and 623 are respectively provided with solenoids 622A and 623A. The opening degree of each of the solenoid proportional control valves 622 and 623 is adjusted in accordance with an electric signal output from the TCS controller 7.

The TCS control hydraulic circuit 6 enables a TCS function through the shifting of the positions of the valves of the above front hydraulic circuit 61 and center hydraulic circuit 62.

When the spool of the front TCS switching valve 611 is set at an upper position and the spool of the center TCS switching valve 621 is set at an upper position in FIG. 2, the TCS function is disabled.

In contrast, when the spool of the front TCS switching valve 611 is set at a lower position and the spool of the center TCS switching valve 621 is set at a lower position in FIG. 2, the TCS function is enabled.

In this case, in the front hydraulic circuit 61, the pressure oil discharged from the front TCS switching valve 611 is supplied to the solenoid proportional control valves 612 and 613. The opening degrees of the solenoid proportional control valves 612 and 613 are adjusted in accordance with an electric signal from the TCS controller 7. The pressure oil discharged from the solenoid proportional control valves 612 and 613 is supplied to the front brakes 41 via the shuttle valves 614 and 615.

In the center hydraulic circuit 62, the pressure oil discharged from the center TCS switching valve 621 is supplied to the solenoid proportional control valves 622 and 623. The pressure oil discharged from the solenoid proportional control valves 622 and 623 is supplied to the center brakes 42 via the shuttle valves 624 and 625.

At this time, the TCS controller 7 monitors the rotation speeds of the wheels 4 detected by the rotation speed sensors 43FL, 43FR, 43CL and 43CR and outputs electric signals to the solenoids 612A, 613A, 622A and 623A in accordance with the slip ratios of the wheels 4 (which will be described later in detail). As a result, the opening degrees of the solenoid proportional control valves 612, 613, 622 and 623 are adjusted, thereby adjusting the braking forces of the front brakes 41 and center brakes 42. In this manner, while adjusting the driving force of each of the wheels 4 to an optimum value, the TCS controller 7 performs control for ensuring course traceability when the vehicle is turned.

When the brake pedal 523 is operated, on the front side, the pressure oil discharged from the front brake valve 521 is supplied to the front brakes 41 via the shuttle valves 614 and 615, so that each of the front brakes 41 functions as a normal brake that increases the braking force thereof in accordance with the pressed amount of the brake pedal 523. On the rear side, the pressure oil discharged from the center brake valve 522 is supplied to the center brakes 42 via the shuttle valves 624 and 625, and each of the center brakes 42 likewise functions as a normal brake.

The solenoid proportional control valves 612, 613, 622 and 623 are also used as control valves for retarder control. The opening degree of each of the solenoid proportional control valves 612, 613, 622 and 623 is adjusted in accordance with a retarder command signal from the TCS controller 7.

4. Structure of TCS Controller 7

Figure 3:
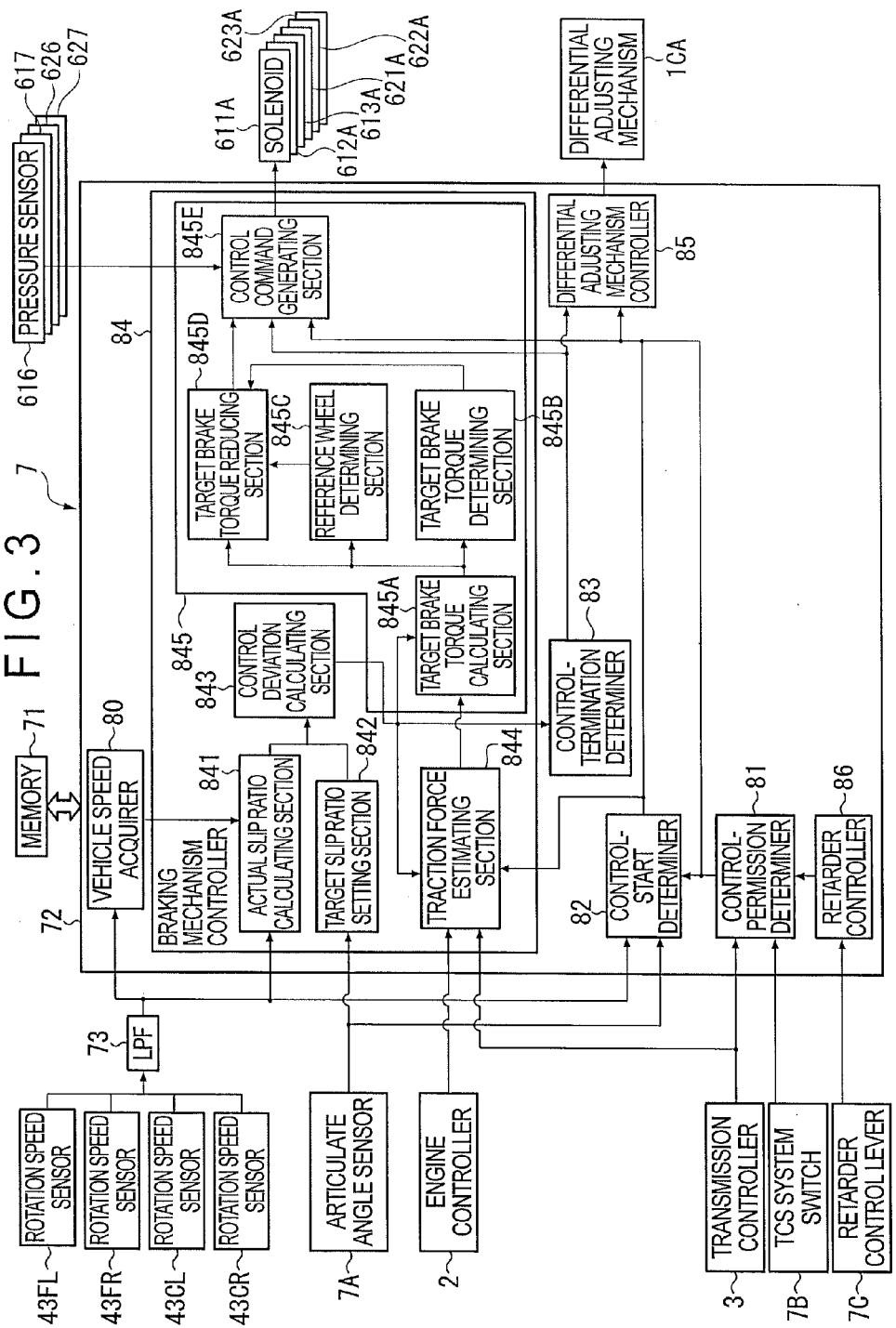
FIG. 3 is a functional block diagram of a TCS controller according to the exemplary embodiment.
Figure 4:
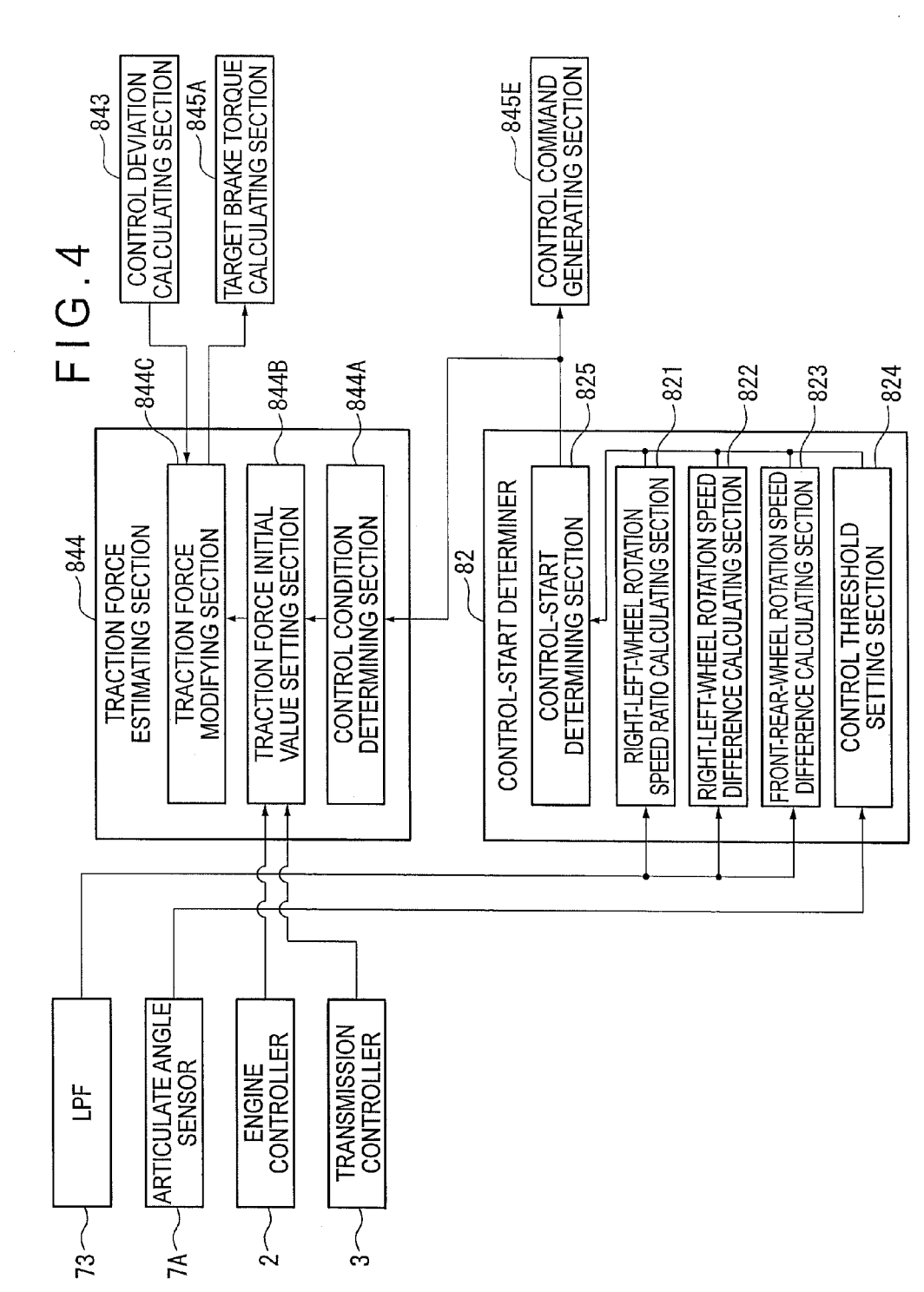

FIGS. 3 and 4 show the structure of the TCS controller 7 that performs the above TCS control.

The TCS controller 7 includes a memory 71 as a storage and a processor 72.

The memory 71 stores not only a program executable on the processor 72 but also a map for TCS sliding mode control and the like, which are readable upon a request from the processor 72.

The rotation speed sensors 43FL, 43FR, 43CL and 43CR, the articulate angle sensor 7A, the TCS system switch 7B, the retarder control lever 7C and the pressure sensors 616, 617, 626 and 627 are electrically connected to the input side of the processor 72. The rotation speed sensors 43FL, 43FR, 43CL and 43CR are connected to the processor 72 via an LPF (Low Pass Filter) 73, so that rotation speed signals output from the rotation speed sensors 43FL, 43FR, 43CL and 43CR, from which a high-frequency component such as disturbance has been eliminated, are input to the processor 72 as rotation speeds $\omega fl$, $\omega fr$, $\omega cl$ and $\omega cr$.

In contrast, the solenoids 611A and 621A of the TCS switching valves 611 and 621 and the solenoids 612A, 613A, 622A and 623A of the solenoid proportional control valves 612, 613, 622 and 623 of the TCS control hydraulic circuit 6 are electrically connected to the output side of the processor 72.

The processor 72 is also electrically connected to the engine controller 2 and the transmission controller 3 so that information is exchangeable therebetween. Thus, the processor 72 can acquire various kinds of information required for the TCS control from the engine controller 2 and the transmission controller 3, such as an output torque value of the engine from the engine controller 2, and speed stage information and lockup information from the transmission controller 3.

The processor 72 includes a vehicle speed acquirer (vehicle speed estimator) 80, a control-permission determiner 81, a control-start determiner 82, a control-termination determiner 83, a braking mechanism controller 84, a differential adjusting mechanism controller 85 and a retarder controller 86.

The vehicle speed acquirer 80 is a section for acquiring the vehicle speed of the construction machine. In this exemplary embodiment, the vehicle speed acquirer 80 estimates a vehicle speed V at a certain time based on the rotation speeds $\omega fl$, $\omega fr$, $\omega cl$ and $\omega cr$ of the wheels 4 acquired from the rotation speed sensors 43FL, 43FR, 43CL and 43CR.

The control-permission determiner 81 determines whether or not to permit the TCS control. Specifically, the control-permission determiner 81 determines whether or not to permit the TCS control based on an on-off state of the TCS system switch 7B, an operation condition of the brake pedal 523, the speed stage information of the transmission 1B, a control condition of the retarder control, and an operation condition of an accelerator pedal (not shown).

The control-start determiner 82 is a section for determining whether or not start conditions for the TCS control have been fulfilled. Specifically, the control-start determiner 82 determines whether or not to start the TCS brake control and the inter-axle differential control based on a ratio $\omega ee$ between the rotation speeds of the right and left wheels, a difference $\omega lr$ between the rotation speeds of the right and left wheels, and a difference $\omega fc$ between the rotation speeds of the front and rear wheels, which are calculated by the following equations (1) to (3).

Specifically, the control-start determiner 82 includes a right-left-wheel rotation speed ratio calculating section 821, a right-left-wheel rotation speed difference calculating section 822, a front-rear-wheel rotation speed difference calculating section 823, a control threshold setting section 824 and a control-start determining section 825.

The right-left-wheel rotation speed ratio calculating section 821 calculates the ratio $\omega ee$ between the rotation speeds of the right and left wheels by using the following equation (1). The right-left-wheel rotation speed difference calculating section 822 calculates the difference $\omega lr$ between the rotation speeds of the right and left wheels by using the following equation (2). These calculations are performed not only for the front wheels but also for the center wheels. The front-rear-wheel rotation speed difference calculating section 823 calculates the difference $\omega fc$ between the rotation speeds of the front and rear wheels by using the following equation (3).

Equation 1

$$\omega ee = |(\omega l - \omega r)/(\omega l - \omega r)| \quad (1)$$

Equation 2

$$\omega lr = |(\omega l - \omega r)| \quad (2)$$

Equation 3

$$\omega fc = |(\omega fl + \omega fr)/2 - (\omega cl + \omega cr)/2| \quad (3)$$

The control threshold setting section 824 modifies a predetermined threshold having been stored in the memory 71 based on an articulate angle and a change amount in the articulate angle, thereby setting a control-start threshold. Specifically, the control threshold setting section 824 modifies a predetermined threshold for a right-left-wheel rotation speed ratio and a predetermined threshold for a right-left-wheel rotation speed difference stored in the memory 71 in accordance with the articulate angle and the change amount in the articulate angle, thereby setting a control-start threshold for a right-left-wheel rotation speed ratio and a control-start threshold for a right-left-wheel rotation speed difference. The control threshold setting section 824 sets a control-start threshold for a front-rear wheel speed difference in accordance with a vehicle speed.

The control-start determining section 825 determines whether or not at least one of the calculated rotation speed ratio $\omega ee$ of the right and left wheels, the calculated rotation speed difference $\omega lr$ of the right and left wheels, and the rotation speed difference $\omega fc$ of the front and rear wheels reaches or exceeds the threshold set by the control threshold setting section 824. In accordance with the result of this determination, the control-start determining section 825 determines whether or not to start the TCS brake control and the inter-axle differential control.

The control-termination determiner 83 is a section for determining whether or not to terminate the TCS control. In this exemplary embodiment, the control-termination determiner 83 determines whether or not to terminate the TCS brake control on the front wheels, the TCS brake control on the center wheels, and the inter-axle differential control with reference to a control deviation S of each of the wheels 4 (which will be described later).

The braking mechanism controller 84 is a section for generating and outputting a control command for the TCS. The braking mechanism controller 84 includes an actual slip ratio calculating section 841, a target slip ratio setting section 842, a control deviation calculating section (control deviation calculator) 843, a traction force estimating section (traction force estimator) 844 and a braking mechanism controlling section 845.

The actual slip ratio calculating section 841 calculates an actual slip ratio $\lambda$ of each of the wheels 4 by using the following equation (4) based on the vehicle speed V acquired by the vehicle speed acquirer 80, a radius r of the wheels 4, and the rotation speeds $\omega fl$, $\omega fr$, $\omega cl$ and $\omega cr$ of the wheels 4.

Equation 4

$$\lambda = (r \cdot \omega - V)/(r \cdot \omega) \quad (4)$$

The target slip ratio setting section 842 calculates a target slip ratio $\eta$ for each of the wheels 4 by using the following equation (5). In the equation (5), $\eta s$ denotes a reference target slip ratio, which is provided by a predetermined value having been stored in the memory 71 in this exemplary embodiment. ηa denotes a modifying target slip ratio, which is added to the reference target slip ratio ηs so as to set a target slip ratio for an outer wheel when the vehicle is turned. The modifying target slip ratio is set in accordance with the articulate angle. Thus, when the articulate angle becomes larger, the modifying target slip ratio ηa is also set at a larger value.

Equation 5

$$\eta = \eta s + \eta a \tag{5}$$

The control deviation calculating section 843 calculates the control deviation S (i.e., a deviation in a control amount between a target value and an actual value) used for generating a control command. In this exemplary embodiment, since the TCS control is performed based on sliding mode control, the control deviation S is calculated by the following equation (6) using the slip ratio λ, and the target slip ratio η.

Equation 6

$$S = \lambda - \eta \tag{6}$$

The traction force estimating section 844 estimates a force transmitted from the wheels 4 to the road surface (i.e., traction force) based on the output torque of the engine sent from the engine controller 2, speed stage information sent from the transmission controller 3, and the specification data of the dump truck 1 having been stored in the memory 71. The traction force estimating section 844 also modifies the traction force in accordance with the control deviation S provided from the control deviation calculating section 843 so that the TCS control is stabilized even when an error in the estimation of the traction force is large.

Specifically, the traction force estimating section 844 includes a control condition determining section 844A, a traction force initial value setting section 844B and a traction force modifying section 844C.

The control condition determining section 844A determines a control condition of the TCS control based on the result of the determination of the control-start determiner 82.

The traction force initial value setting section 844B sets an initial value of the traction force based on the result of the determination of the control condition determining section 844A. In order to set the initial value, when neither the TCS brake control nor the inter-axle differential control is performed, the traction force initial value setting section 844B acquires an input driving force Fin1 of the wheels 4 obtained by the following equation (7). When the TCS brake control is performed only on the front wheels 4 or the center wheels 4, the traction force initial value setting section 844B continuously acquires an input driving force Fin2 obtained by the following equation (8) for the wheels on which the TCS brake control is not performed. The traction force initial value setting section 844B uses the input driving force Fin1 or the input driving force Fin2 to initialize the traction force.

Equation 7

$$Fin1 = (Ts/2 - J \cdot (d\omega/dt))/r \tag{7}$$

Equation 8

$$Fin2 = (Fin1 \cdot r - J \cdot (d\omega/dt))/r \tag{8}$$

In this exemplary embodiment, J denotes the inertia of the wheels 4, and Ts denotes an output torque from the differential mechanism 1D of the front wheels 4 or the differential mechanism 1E of the center wheels 4. The output torque Ts has been stored in the memory 71.

The calculation is made based on the specification data of the dump truck 1 such as a reduction ratio of each of the differential mechanisms 1C to 1F, the output torque of the engine sent from the engine controller 2, and the speed stage information sent from the transmission controller 3.

The traction force modifying section 844C modifies the traction force based on the control deviation S of the TCS control. In this exemplary embodiment, since the TCS control is performed based on sliding mode control, the traction force modifying section 844C of this exemplary embodiment modifies the traction force based on the control deviation S calculated by the control deviation calculating section 843. For the modification, when the traction force is initialized by the traction force initial value setting section 844B, the traction force modifying section 844C takes this initial value, and otherwise, takes the traction force obtained in the former calculation cycle.

The braking mechanism controlling section 845 generates and outputs a control command for the TCS brake control. In this exemplary embodiment, the braking mechanism controller 84 applies a control law of sliding mode control to the vehicle model of the dump truck 1 so as to generate and output a control command to the TCS control hydraulic circuit 6.

Specifically, the braking mechanism controlling section 845 includes a target brake torque calculating section 845A, a target brake torque determining section 845B, a reference wheel determining section 845C, a target brake torque reducing section 845D and a control command generating section 845E.

The target brake torque calculating section 845A calculates a target brake torque to each of the wheels 4 for the TCS brake control in accordance with the vehicle model of the dump truck 1. The vehicle model of the dump truck 1 is represented by the following equation (9) using the inertial J of the wheels, the rotation speed ω of the wheels, a torque Tin that is output from the differential mechanism 1C (1E) into the wheels, a traction force F, and a brake torque Tb.

Equation 9

$$J \cdot (d\omega/dt) = Tin/2 - r \cdot F - Tb \tag{9}$$

When the equation (6) is transformed to S' by using the equation (4) and S' is differentiated, the following equation (10) is derived.

Equation 10

$$dS'/dt = (1-\eta) \cdot r \cdot (d\omega/dt) - dV/dt \tag{10}$$

Figure 5:
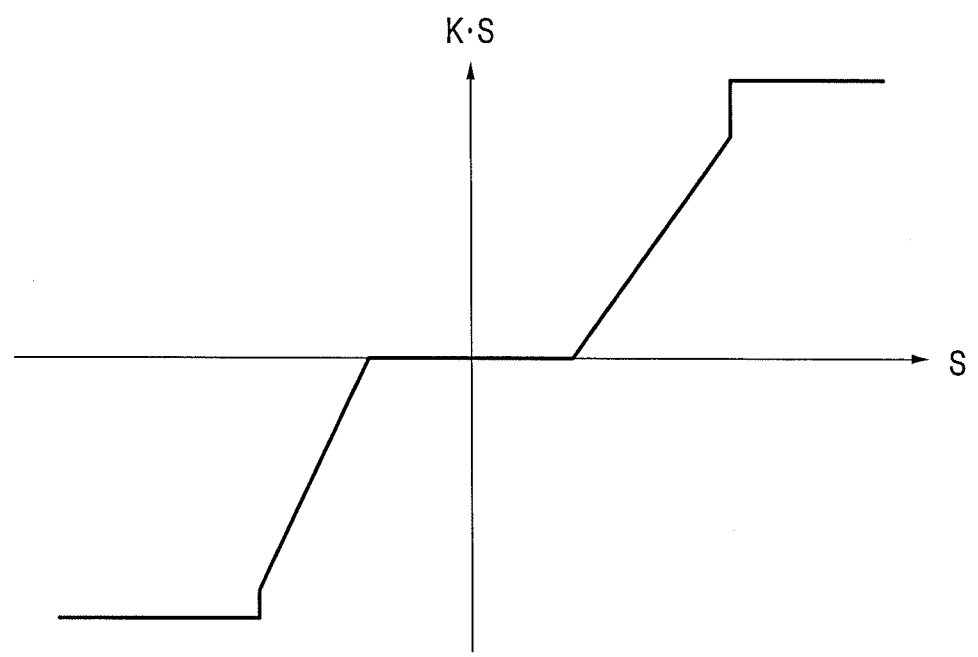
FIG. 5 shows a relationship between a control deviation of TCS control according to the exemplary embodiment and a control gain of sliding mode control.

In accordance with the control law of sliding mode control, the following equation (11) is derived. In the equation, K denotes a control gain of sliding mode control, which is set to have properties, for instance, shown in FIG. 5.

Equation 11

$$dS'/dt = -K \cdot S \tag{11}$$

Further, when α=(1−η)·r/J, the following equation (12) is derived from the equations (9) to (11).

Equation 12

$$Tb = Tin/2 - r \cdot F - (dV/dt)/\alpha + (K/\alpha) \cdot S \tag{12}$$

On the assumption of a two-wheel model, the following equation (13) is established.

Equation 13

$$Tin = r(Fr+Fl) + (Tbl+Tbr) + J \cdot ((d\omega l/dt) + (d\omega r/dt)) \tag{13}$$

The following equations (14) and (15) are derived from the equations (12) and (13).

Equation 14

$$Tbl = Tin/2 - r \cdot Fl - (dV/dt)/\alpha + (K/\alpha) \cdot S \quad (14)$$

Equation 15

$$Tbr = Tin/2 - r \cdot Fr - (dV/dt)/\alpha + (K/\alpha) \cdot S \quad (15)$$

As a result, a brake torque is finally obtained by the following equations (16) and (17). The target brake torque calculating section 845A uses the equations (16) and (17) to calculate the target brake torque to each of the wheels 4.

Equation 16

$$Tbl = J \cdot (d\omega l/dt + d\omega r/dt)/2 + r \cdot (Fr - Fl)/2 + (Tbl + Tbr)/2 - (dV/dt)/\alpha + (K/\alpha) \cdot S \quad (16)$$

Equation 17

$$Tbr = J \cdot (d\omega l/dt + d\omega r/dt)/2 + r \cdot (Fl - Fr)/2 + (Tbl + Tbr)/2 - (dV/dt)/\alpha + (K/\alpha) \cdot S \quad (17)$$

The brake torque Tb is proportional to a brake pressure P, and a relationship represented by the following equation (18) is established between the brake torque Tb and the brake pressure P (k: brake torque conversion coefficient).

Equation 18

$$Tb = k \cdot P \quad (18)$$

In other words, the brake pressure P is a value univocal to the brake torque Tb, and the brake torque Tb and the brake pressure P are in an equivalence relationship as parameters for adjusting a braking amount. The target brake torque calculating section 845A of this exemplary embodiment converts the target brake torque to each of the wheels 4 into a target brake pressure by using the equation (18).

The target brake torque determining section 845B determines whether or not the target brake torque to each of the wheels 4 reaches or exceeds a threshold having been stored in the memory 71. Specifically, the target brake torque determining section 845B determines whether or not the target brake torque to both front wheels 4 and the target brake torque to both center wheels 4 reach or exceed a threshold for the front wheels and a threshold for the rear wheels, respectively.

Since the brake torque Tb and the brake pressure P are in the equivalence relationship as described above, the target brake torque determining section 845B of this exemplary embodiment uses the target brake pressures to perform the determination. For the above determination, respective pressure thresholds of the target brake pressures for the front wheels and the rear wheels and respective brake torque conversion coefficients for the front wheels and the rear wheels have been stored in the memory 71. Specifically, a threshold of each of the target brake torques has been stored separately as a pressure threshold and a brake torque conversion coefficient, and the pressure threshold multiplied by the brake torque conversion coefficient is the threshold of the target brake torque.

The reference wheel determining section 845C determines a reference wheel for the TCS brake control based on the target brake torques of the wheels 4. Since the target brake pressures correspond to the target brake torques as described above, the reference wheel determining section 845C of this exemplary embodiment uses the target brake pressures to determine the reference wheel.

When the target brake torques of the wheels 4 reach or exceed the respective thresholds, the target brake torque reducing section 845D reduces the target brake torques of the wheels 4 in accordance with a difference between the target brake torque of the reference wheel and the threshold thereof. In this exemplary embodiment, the target brake torque reducing section 845D uses the target brake pressures for performing the above process in the same manner as the target brake torque determining section 845B and the reference wheel determining section 845C.

The control command generating section 845E generates respective control commands to the solenoid proportional control valves 612, 613, 622 and 623 for braking the wheels 4 at the brake pressures P corresponding to the target brake torques and outputs control signals to the solenoids 612A, 613A, 622A and 623A of the solenoid proportional control valves 612, 613, 622 and 623. As a result, the opening degrees of the solenoid proportional control valves 612, 613, 622 and 623 are adjusted, thereby controlling the braking force to each of the wheels 4.

The differential adjusting mechanism controller 85 generates a control command for controlling the differential restraining force of the differential mechanism 1C and outputs the generated control command to the differential adjusting mechanism 1CA. Specifically, when the inter-axle differential control is determined to be performed by the control-start determiner 82, the differential adjusting mechanism controller 85 generates a control command for restraining the differential of the differential mechanism 1C and outputs the control command to the differential adjusting mechanism 1CA.

The retarder controller 86 performs the retarder control in accordance with an operation signal from the retarder control lever 7C. Specifically, the retarder controller 86 performs the above generation and output of the control signals to the solenoids 612A, 613A, 622A and 623A in accordance with an operation signal from the retarder control lever 7C.

5. Operation and Effects of TCS Controller 7

5-1. Summary of Operation of TCS Controller 7

Figure 6:
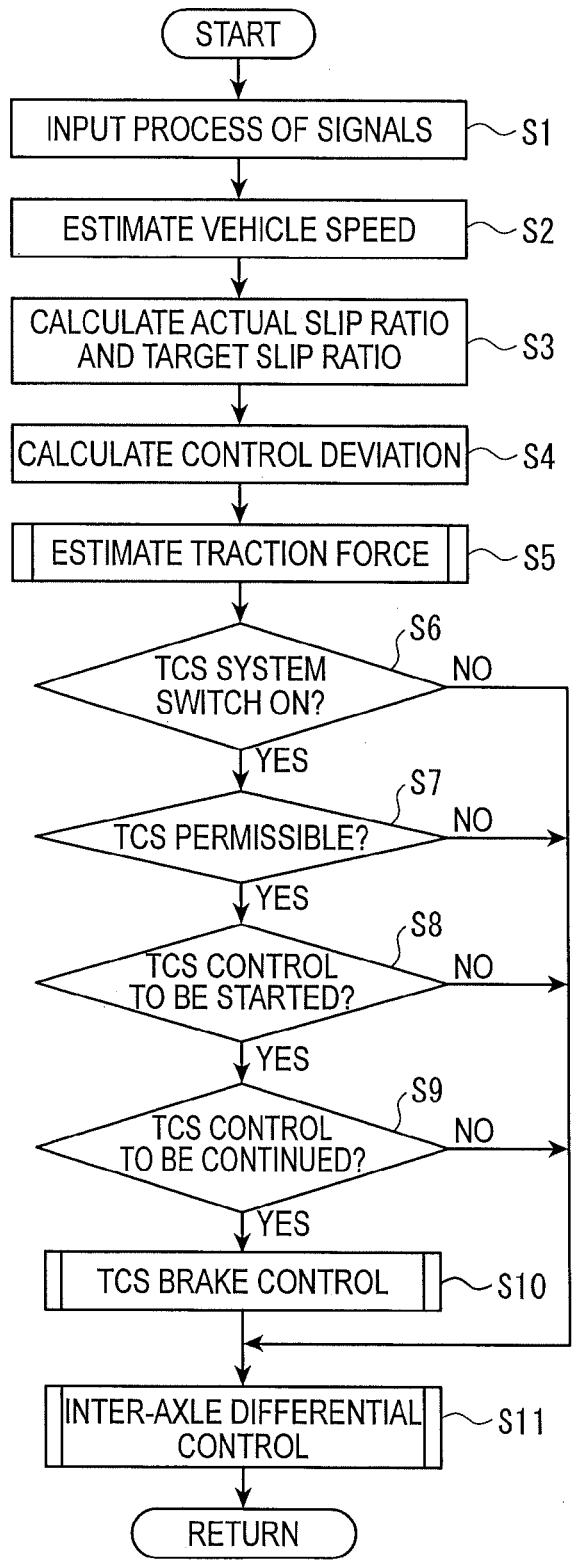
FIG. 6 is a flowchart for illustrating the operation of the TCS controller according to the exemplary embodiment.

A summary of the operation of the above TCS controller 7 will be described with reference to a flowchart shown in FIG. 6.

(1) The TCS controller 7 acquires input signals such as the rotation speeds ωfl, ωfr, ωcl and ωcr of the wheels 4 output from the rotation speed sensors 43FL, 43FR, 43CL and 43CR, the articulate angle output from the articulate angle sensor 7A, engine torque information from the engine controller 2, the speed stage information from the transmission controller 3, and a lockup operation signal (Step S1).

(2) The vehicle speed acquirer 80 estimates the vehicle speed V achieved at a certain time based on the rotation speeds ωfl, ωfr, ωcl and ωcr of the wheels 4 (Step S2).

(3) In the braking mechanism controller 84, the actual slip ratio calculating section 841 calculates the actual slip ratio λ of each of the wheels 4 based on the vehicle speed V acquired by the vehicle speed acquirer 80, the radius r of the wheels 4, and the rotation speeds ωfl, ωfr, ωcl and ωcr of the wheels 4. The target slip ratio setting section 842 calculates the target slip ratio η for each of the wheels 4 based on the reference target slip ratio ηs stored in the memory 71 and the modifying target slip ratio ηa set in accordance with the articulate angle (Step S3).

(4) The control deviation calculating section 843 calculates the control deviation S of each of the wheels 4 from the slip ratio λ and the target slip ratio η (Step S4).

(5) The traction force estimating section 844 estimates the traction forces of the front wheels 4 and the center wheels 4 based on the engine output torque sent from the engine controller 2, the speed stage information sent from the transmission controller 3, and the specification data of the dump truck 1 (Step S5). The traction forces F may not be necessarily estimated at this stage as long as it is estimated before Step S10 (which will be described later).

(6) In order to determine whether or not to permit the TCS control, the control-permission determiner 81 first refers to the on-off state of the TCS system switch 7B (Step S6). When the TCS system switch 7B is in a TCS control cancelling condition, the control-permission determiner 81 does not permit the TCS control. In this case, the TCS control is not performed, so that the driving force transmitted from the engine 1A via the transmission 1B and the differential mechanisms 1C to 1F is directly transmitted to the wheels 4.

(7) In contrast, when the TCS system switch 7B is not in the TCS control cancelling condition, the control-permission determiner 81 determines whether or not to permit the TCS control based on a command value of the retarder control, an on-off state of the brake pedal, the position of the speed stage of the transmission 1B, and an on-off state of the accelerator pedal (Step S7). Specifically, the control-permission determiner 81 determines whether or not to permit the TCS control in accordance with the following Table 1. When it is determined not to permit the TCS in Step S7, the TCS control is not performed. Otherwise, the process goes to the next step.

TABLE 1

| Conditions | TCS control permission |
|---|---|
| retarder command values to front wheels and center wheels < thresholds, brake pedal: off, speed stage position: any one of 1 speed to 3 speed in reverse or forward direction, and acceleration pedal: on | permitted |
| retarder command values to front wheels or center wheels ≧ thresholds, brake pedal: on, speed stage position: neutral or any one of 4 speed to 6 speed in forward direction, or acceleration pedal: off | not permitted |

(8) In the control-start determiner 82, the control-start determining section 825 determines whether or not at least one of the rotation speed ratio wee of the right and left wheels, the rotation speed difference ωlr of the right and left wheels and the rotation speed difference ωfc of the front and rear wheels (which are calculated by the right-left-wheel rotation speed ratio calculating section 821, the right-left-wheel rotation speed difference calculating section 822 and the front-rear-wheel rotation speed difference calculating section 823, respectively) exceeds the threshold thereof calculated by the control threshold setting section 824. Specifically, the control-start determiner 82 determines whether or not to start the TCS brake control and the inter-axle differential control in accordance with the following Table 2 (Step S8).

TABLE 2

| Pattern | Conditions | TCS Brake Control | Inter-axle Diff. Control |
|---|---|---|---|
| A | right-left-wheel rotation speed ratio ≧ threshold a | performed | performed |
| B | right-left-wheel rotation speed difference ≧ threshold b | performed | performed |
| C | the opposite one of front wheels (center wheels) is under TCS brake control, right-left-wheel slip ratio ≧ threshold c, and lockup: not in operation | performed | performed |

TABLE 2-continued

| Pattern | Conditions | TCS Brake Control | Inter-axle Diff. Control |
|---|---|---|---|
| D1 | front-rear-wheel rotation speed difference ≧ threshold d, transmission output rotation speed < threshold dm, and lockup: in operation | not performed | performed |
| D2 | front-rear-wheel rotation speed difference ≧ threshold d, transmission output rotation speed < threshold dm, and lockup: not in operation | performed | performed |
| E | front-rear-wheel rotation speed difference ≧ threshold e, and transmission output rotation speed < threshold em | not performed | performed |

In Table 2, the threshold a of the pattern A and the threshold b of the pattern B are set by modifying the predetermined threshold for the right-left-wheel rotation speed ratio and the predetermined threshold for the right-left-wheel rotation speed difference in accordance with the articulate angle and the change amount in the articulate angle. In this manner, the control-start threshold at the time of the turning of the vehicle is set high, thereby preventing the TCS control from being prematurely started due to an inner-outer-wheel speed difference.

The threshold d of the front-rear-wheel rotation speed difference of the patterns D1 and D2 is set smaller than the threshold e of the front-rear-wheel speed difference of the pattern E. The threshold dm of the transmission output rotation speed of the patterns D1 and D2 is set smaller than the threshold em of the transmission output rotation speed of the pattern E. Thus, when the vehicle speed is low, the TCS control can be started at an earlier timing. This results in an improved acceleration, which is required particularly in a low-speed area.

When at least one of the rotation speed ratio wee of the right and left wheels, the rotation speed difference ωlr of the right and left wheels and the rotation speed difference ωfc of the front and rear wheels exceeds the threshold thereof, the control-start determiner 82 starts the counting of a TCS control starting timer. When the count exceeds a predetermined value, the control-start determiner 82 starts at least one of the TCS brake control and the inter-axle differential control in accordance with a pre-stored control pattern table. When the TCS brake control or the inter-axle differential control is required, the control-start determiner 82 sets a related control flag. Otherwise, the control-start determiner 82 resets the related control flag. The front wheels 4 and the center wheels 4 are provided with respective TCS brake control flags, which are separately set or reset as a front TCS brake control flag or a center TCS brake control flag.

(9) The control-termination determiner 83 determines whether or not to terminate the TCS control with reference to the control deviation S of each of the wheels 4. Specifically, when the control deviation S falls below a control-termination threshold, the control-termination determiner 83 resets the TCS brake control flag to instruct the braking mechanism controller 84 to terminate the TCS brake control. The control-termination determiner 83 resets an inter-axle differential control flag to instruct the differential adjusting mechanism controller 85 to terminate the inter-axle differential control (Step S9).

(10) When the TCS brake control is performed, the braking mechanism controller 84 generates the control signals based on the target brake torques calculated by the above equations

(16) and (17) and outputs the generated control signals to the solenoids 612A, 613A, 622A and 623A of the solenoid proportional control valves 612, 613, 622 and 623 (Step S10). As a result, the opening degrees of the solenoid proportional control valves 612, 613, 622 and 623 are adjusted, thereby controlling the braking force to each of the wheels 4.

When the TCS brake control is not performed, the braking mechanism controller 84 outputs to the solenoids 612A, 613A, 622A and 623A signals for setting a current value at zero. At this time, immediately after the TCS brake control flag is switched from being set to being reset, the braking mechanism controller 84 outputs to the solenoids 612A, 613A, 622A and 623A control commands for gradually reducing the brake torques provided by the TCS brake control. Specifically, the braking mechanism controller 84 sends a command for gradually reducing the current value of each of the solenoids 612A, 613A, 622A and 623A from a value at the time when the TCS brake control flag is reset to zero. This results in prevention of a sudden slip caused immediately after the control is terminated. Thus, the TCS control is not intermittently performed in a short cycle.

(11) The differential adjusting mechanism controller 85 performs the inter-axle differential control based on the determination results of the control-start determiner 82 and the control-termination determiner 83 (Step S11). Specifically, when the inter-axle differential control flag is set, the differential adjusting mechanism controller 85 generates a control command for maximizing the differential restraining force of the differential mechanism 1C (command amount 100%) and outputs the control command to the differential adjusting mechanism 1CA. When the inter-axle differential control flag is not set, the differential adjusting mechanism controller 85 generates a control command for setting the differential restraining force of the differential mechanism 1C at zero (command amount 0%) and outputs the control command to the differential adjusting mechanism 1 CA.

5-2. Detailed Description of Operation of Traction Force Estimating Section 844

A detailed description will be made below on the operation of the traction force estimating section 844 of the TCS controller 7 with reference to FIGS. 7 to 9.

Figure 7:
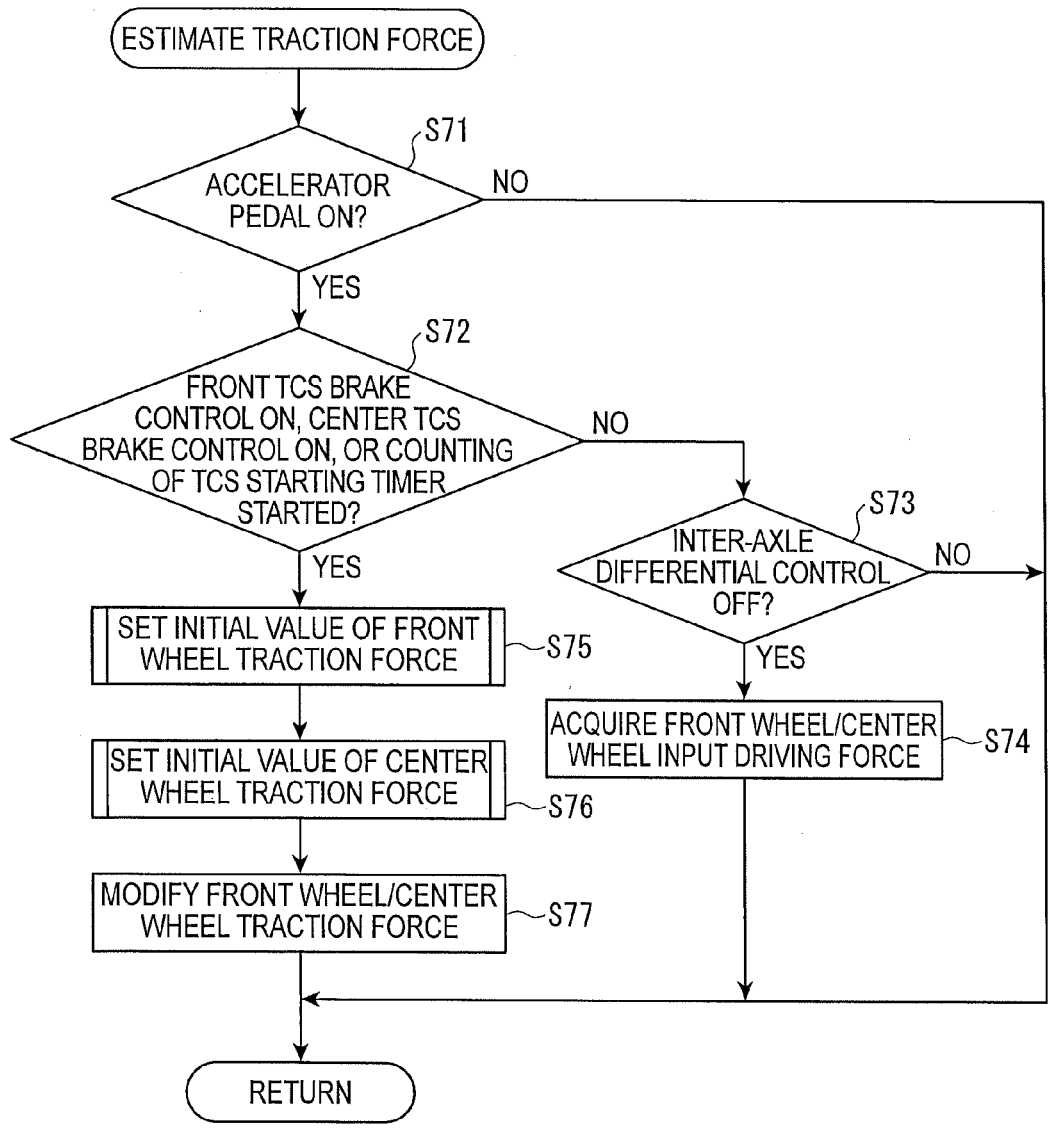
FIG. 7 is a flowchart for illustrating the operation of the TCS controller according to the exemplary embodiment.

In FIG. 7, the traction force estimating section 844 first determines whether or not the accelerator pedal is on (Step S71).

When the accelerator pedal is on, the control condition determining section 844A determines the control condition of the TCS brake control. Specifically, the control condition determining section 844A determines: whether or not the front TCS brake control flag is set, whether or not the center TCS brake control flag is set, and whether or not the counting of the TCS control starting timer has been started (Step S72).

In Step S72, when none of the TCS brake control flags of the front wheels 4 and the center wheels 4 is set and it is determined that the counting of the TCS control starting timer has not been started, the control condition determining section 844A further determines whether or not the inter-axle differential control flag is set (Step S73). When the inter-axle differential control flag is not set, the traction force initial value setting section 844B acquires the input driving force Fin1 of the front wheels 4 and the center wheels 4 by using the equation (7) (Step S74).

In contrast, when the TCS brake control flag of the front wheels 4 or the center wheels 4 is set or when it is determined that the counting of the TCS control starting timer has been started, the traction force estimating section 844 sets an initial value of the traction force F of the front wheels 4 (Step S75) and sets an initial value of the traction force F of the center wheels 4 (Step S76).

Figure 8:
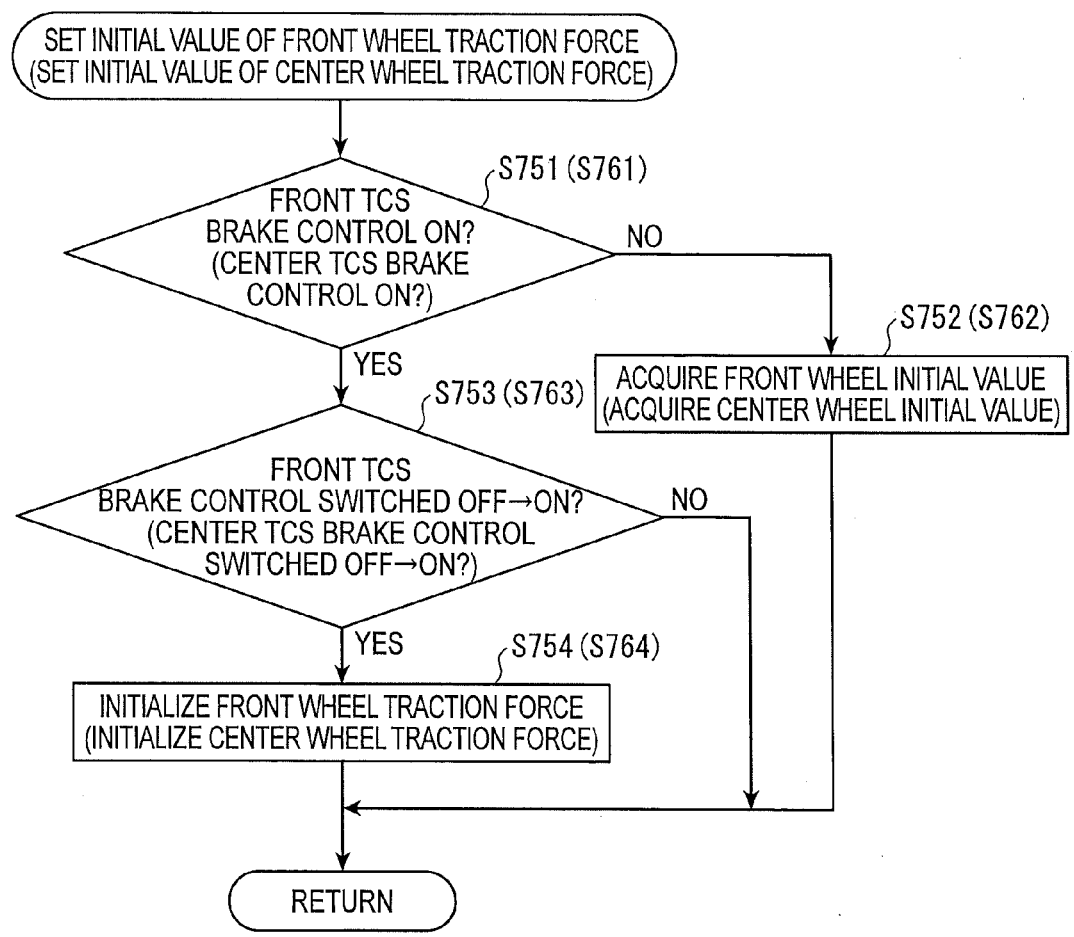
FIG. 8 is a flowchart for illustrating the operation of the TCS controller according to the exemplary embodiment.

With reference to FIG. 8, a detailed description will be made on the setting of the initial values of the traction force F of the front wheels 4 and the center wheels 4.

In order to set the initial value of the traction force F of the front wheels 4, the control condition determining section 844A first determines whether or not the front TCS brake control flag is set (Step S751).

When it is determined that the front TCS brake control flag is not set in Step S751, the traction force initial value setting section 844B acquires the input driving force Fin2 of the front wheels 4 by using the equation (8) (Step S752).

In contrast, when it is determined that the front TCS brake control flag is set in Step S751, the control condition determining section 844A further determines whether or not the TCS brake control on the front wheels 4 has been switched on (Step S753). When it is determined that the TCS brake control on the front wheels 4 has been switched on, the traction force initial value setting section 844B initializes the traction force F of the controlled wheels 4. For the initialization, when the input driving force Fin2 of the wheels 4 is calculated, the traction force initial value setting section 844B uses the input driving force Fin2, and otherwise, uses the input driving force Fin1 (Step S754).

The initial value of the traction force F of the center wheels 4 is set in the same manner as that of the front wheels 4 as shown in S761 to S764 in FIG. 8, the description of which is omitted herein.

Referring back to FIG. 7, after the setting of the initial values of the traction force F of the front wheels 4 and the center wheels 4, the traction force modifying section 844C modifies the traction force F of the front wheels 4 and the traction force F of the center wheels 4 in accordance with the amount of the control deviation S (Step S77).

Figure 9:
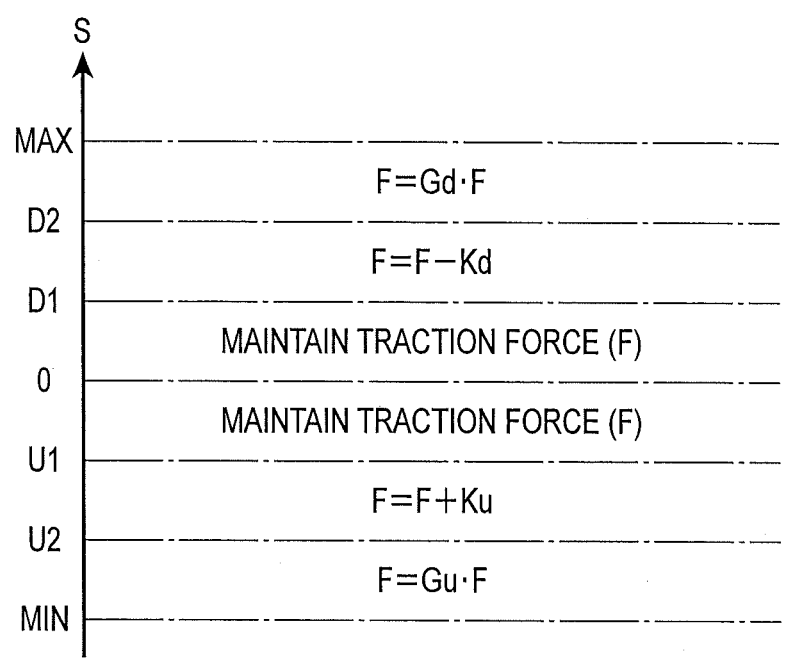
FIG. 9 illustrates the operation of the TCS controller according to the exemplary embodiment.

Specifically, as shown in FIG. 9, when the control deviation S is within a range from a predetermined value D1 to a predetermined value U1 (the range includes zero), the traction force modifying section 844C does not modify the traction force F but keeps the present value thereof.

When the control deviation S is within a range from the predetermined value D1 to a predetermined value D2 (the range extends above D1), the traction force modifying section 844C reduces the traction force F by a predetermined value Kd in each calculation cycle. When the control deviation S is within a range from the predetermined value U1 to a predetermined value U2 (the range extends below U1), the traction force modifying section 844C increases the traction force F by the predetermined value Kd in each calculation cycle. As a result, the traction force F is gradually modified so that the absolute value of the control deviation S is getting smaller (i.e., the TCS control is getting converged).

When the control deviation S exceeds the predetermined value D2, the traction force modifying section 844C multiplies the traction force F by a coefficient Gd every elapse of a predetermined interval time longer than the calculation cycle. When the control deviation S falls below the predetermined value U2, the traction force modifying section 844C multiplies the traction force F by a coefficient Gu every elapse of the interval time. As a result, the traction force F is rapidly modified as compared with an instance where the absolute value of the control deviation S is the predetermined value D2 or less or is the predetermined value U2 or less.

In this exemplary embodiment, since the reference target slip ratio $\eta s$ is set at 35%, the control deviation S of zero corresponds to the slip ratio of 35%. When the actual slip ratio λ exceeds 45%, the driving force transmittable to the road surface and the side force of the wheels start decreasing. When the slip ratio λ exceeds 55%, both driving force and side force significantly decrease to cause a reduction in the acceleration and course traceability. In contrast, when the slip ratio λ falls below 25%, the driving force transmittable to the road surface starts decreasing. When the slip ratio λ falls below 15%, the driving force significantly decreases, so that the resultant driving force becomes insufficient for the friction coefficient of the road surface, which causes failure in acceleration. When the value of the slip ratio λ is within the above range even under the TCS control, an error in the estimation of the traction force F may be large. In this exemplary embodiment, in view of the above, the U2, U1, D1 and D2 are set at values corresponding to 15%, 25%, 45% and 55% in terms of the slip ratio, respectively, and the modification speed of the traction force is changed in accordance with the value of the control deviation S, thereby smoothly and promptly eliminating the error in the estimation of the traction force.

5-3. Detailed Description of Operation of Braking Mechanism Controller 84.

With reference to a flowchart shown in FIG. 10 and FIG. 11, a detailed description will be made below on the TCS brake control, in particular, the operations of the target brake torque calculating section 845A, target brake torque determining section 845B, reference wheel determining section 845C, target brake torque reducing section 845D and control command generating section 845E of the braking mechanism controller 84.

Figure 10:
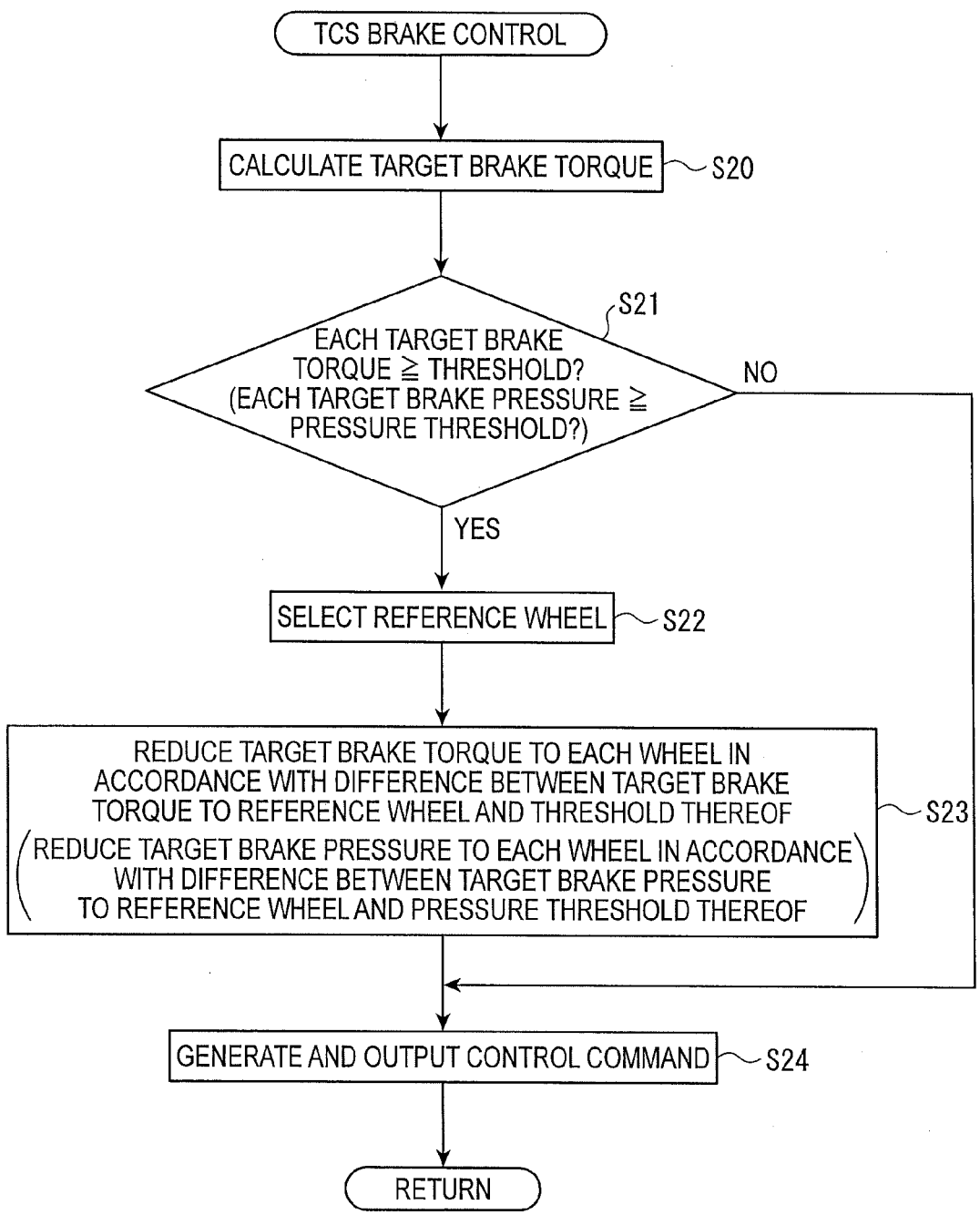
FIG. 10 is a flowchart for illustrating the operation of the TCS controller according to the exemplary embodiment.

In FIG. 10, first of all, the target brake torque calculating section 845A calculates the target brake torque to each of the wheels 4 by using the above equations (16) and (17) (Step S20). The target brake torque calculating section 845A also converts the target brake torque to each of the wheels 4 into a target brake pressure by using the equation (18).

Next, the target brake torque determining section 845B determines whether or not the target brake torque to each of the wheels 4 reaches or exceeds the threshold. The brake torque and the brake pressure P are in the equivalence relationship as parameters for adjusting the braking amount as described above. In view of the above, in this exemplary embodiment, the target brake torque determining section 845B determines whether or not the target brake pressures to both front wheels 4 reach or exceed the pressure threshold for the front wheels and whether or not the target brake pressures to both center wheels 4 reach or exceed the pressure threshold for the center wheels (Step S21).

When the target brake torques to both front wheels 4 and both center wheels 4 reach or exceed the respective thresholds, the reference wheel determining section 845C determines the reference wheel. In this exemplary embodiment, the reference wheel determining section 845C selects one of the wheels 4 having the smallest target brake pressure as the reference wheel (Step S22).

Figure 11:
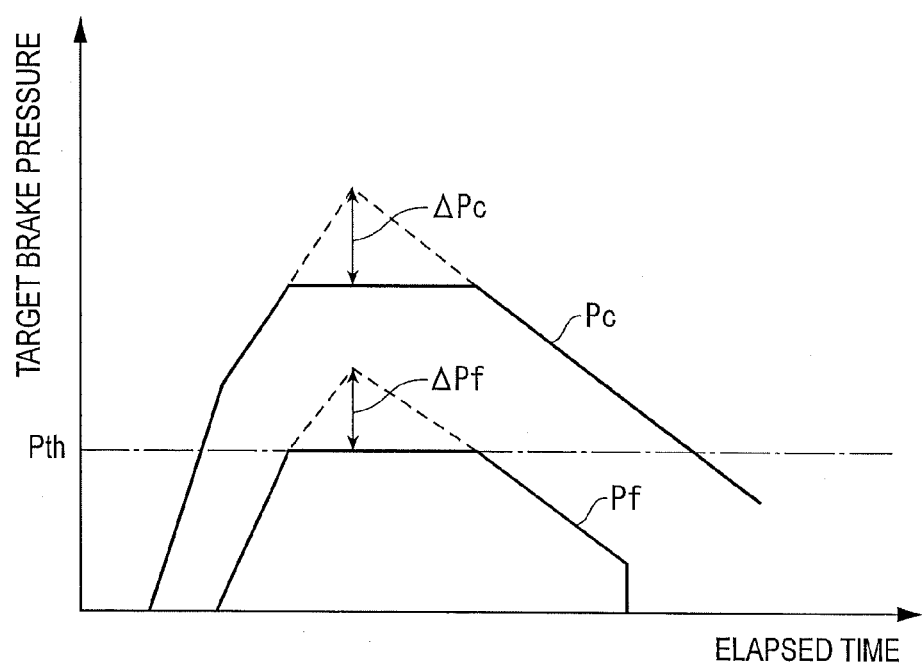
FIG. 11 illustrates the operation of a braking mechanism controller according to the exemplary embodiment.

For instance, in FIG. 11 showing the target brake pressures to one of the front wheels 4 and one of the center wheels 4, the reference wheel determining section 845C finds a target brake pressure Pf to the front wheel 4 is smaller than a target brake pressure Pc to the center wheel 4 and selects the front wheel 4 as the reference wheel. Although the selection of the reference wheel and a reduction in the target brake torque (which is described later) are actually performed with reference to the target brake pressures Pf and Pc to all the driving wheels 4, FIG. 11 only shows the case of the front wheel 4 having the smallest target brake pressure and the case of one of the center wheels 4 for simplification.

Referring back to FIG. 10, the target brake torque reducing section 845D reduces the target brake torque to each of the wheels 4 in accordance with a difference between the target brake torque to the reference wheel and the threshold thereof (Step S23).

As shown in FIG. 11, the target brake torque reducing section 845D of this exemplary embodiment calculates a differential pressure $\Delta Pf$ between the target brake pressure Pf of the front wheel 4 (the reference wheel) and a pressure threshold Pth thereof. The target brake torque reducing section 845D converts the differential pressure $\Delta Pf$ into a brake torque by using the equation (18) and calculates a value corresponding to a difference between the target brake torque to the reference wheel and the threshold thereof. Since there is a difference in the gain of the brake torque relative to the brake pressure between the front and rear wheels 4, the differential pressure $\Delta Pf$ is converted into a brake torque by using a torque-cut gain as a parameter for adjusting such a difference. Specifically, the target brake torque reducing section 845D multiplies the differential pressure $\Delta Pf$ by a value of the torque-cut gain stored in the memory 71 to convert the differential pressure $\Delta Pf$ into a torque reduction amount $\Delta Tf$ and subtracts the torque reduction amount $\Delta Tf$ from the target brake torque to the reference wheel. The target brake torque reducing section 845D also subtracts the same torque reduction amount $\Delta Tf$ for the reference wheel from the target brake torque to the other front wheel 4, which is not the reference wheel.

The target brake torque reducing section 845D also subtracts the torque reduction amount $\Delta Tf$ for the reference wheel from the target brake torque to each of the center wheels 4 in the same manner as the front wheel. Specifically, as shown in FIG. 11, the target brake torque to each of the center wheels 4 is reduced by the brake pressure $\Delta Pc$ obtained by dividing the torque reduction amount $\Delta Tf$ by the brake torque conversion coefficient k for the center wheels.

In contrast, when one of the center wheels 4 is selected as the reference wheel (illustration of this case is omitted), a differential pressure between the brake pressure Pc to the center wheel 4 selected as the reference wheel and the threshold thereof is converted into a brake torque, and the torque reduction amount $\Delta Tc$ obtained by multiplying the converted brake torque by the value of the torque-cut gain is subtracted from the target brake torque to each of the wheels 4 in the same manner as in the above case where one of the front wheels 4 is the reference wheel.

Referring back to FIG. 10, in Step S21, when the target brake pressure to any one of the wheels 4 falls below the threshold thereof, the target brake torque calculated by the target brake torque calculating section 845A is directly sent to the control command generating section 845E without being reduced.

The control command generating section 845E generates and outputs the control commands to the solenoid proportional control valves 612, 613, 622 and 623 based on the target brake torques to the wheels 4 (Step S24). As a result, the opening degrees of the solenoid proportional control valves 612, 613, 622 and 623 are adjusted, thereby controlling the braking force to each of the wheels 4. When the TCS brake control is not performed, the control command generating section 845E outputs to the solenoids 612A, 613A, 622A and 623A signals for setting a current value at zero.

5-4. Detailed Description of Operation of Differential Adjusting Mechanism Controller 85

Figure 12:
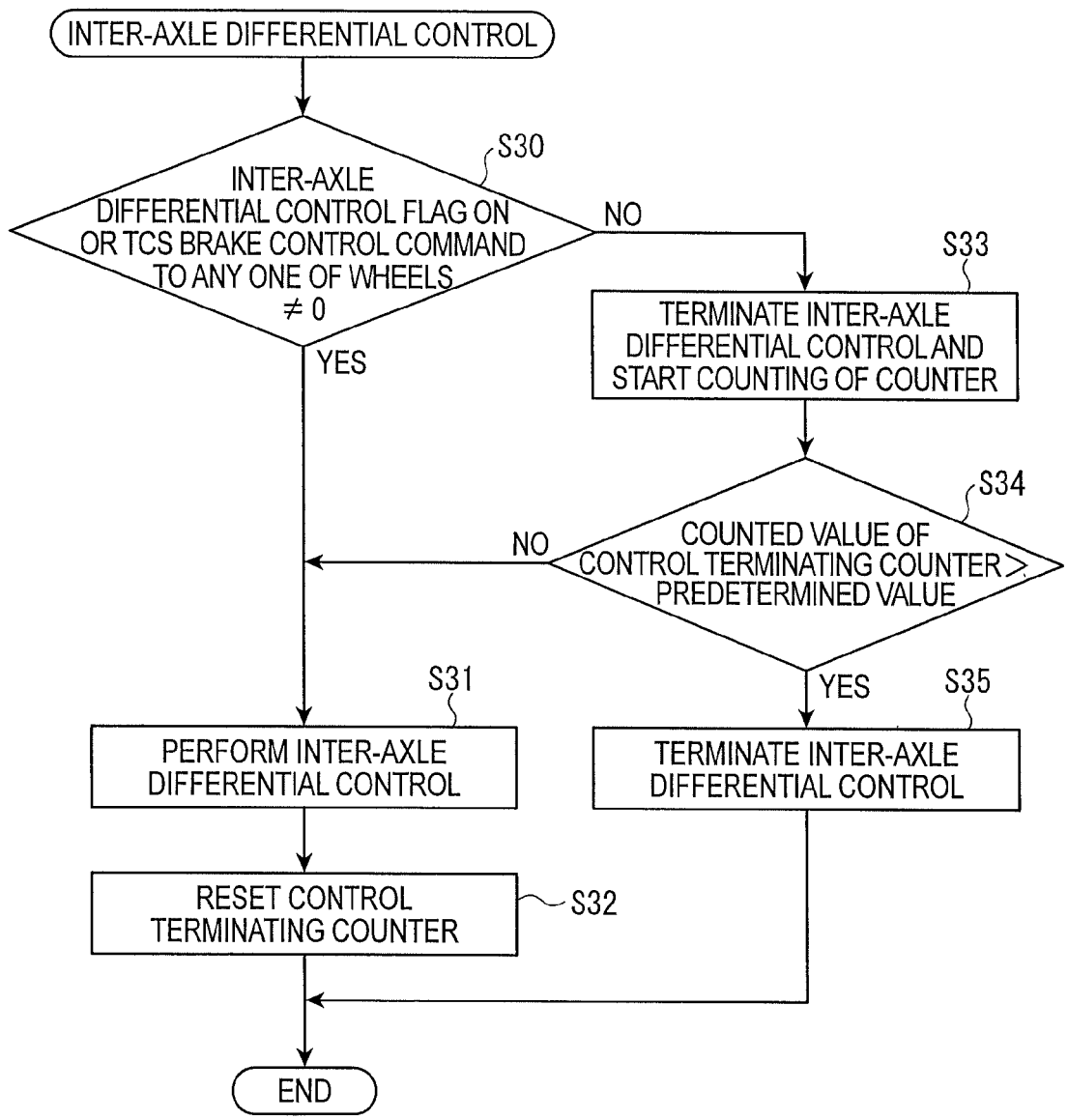
FIG. 12 is a flowchart for illustrating the operation of a differential adjusting mechanism controller according to the exemplary embodiment.

With reference to a flowchart shown in FIG. 12, a further detailed description will be made below on the operation of the differential adjusting mechanism controller 85.

First of all, the differential adjusting mechanism controller 85 finds whether or not to perform the inter-axle differential control (Step S30). Specifically, the differential adjusting mechanism controller 85 finds that the inter-axle differential control is required when the inter-axle differential control flag is on or when the TCS brake control command for any one of the wheels is not zero, and otherwise, finds that the inter-axle differential control is not required. When finding the inter-axle differential control is required, the differential adjusting mechanism controller 85 generates a control command for maximizing the differential restraining force of the differential mechanism 1C (command amount 100%) and outputs the control command to the differential adjusting mechanism 1CA (Step S31). The differential adjusting mechanism controller 85 resets an inter-axle differential control terminating counter (Step S32).

In contrast, when finding that the inter-axle differential control is not required, the differential adjusting mechanism controller 85 starts the counting of the inter-axle differential control terminating counter (Step S33) and then determines whether or not the counter has counted a predetermined elapsed time (Step S34). When determining that the counter has not counted the predetermined elapsed time, the differential adjusting mechanism controller 85 outputs the control command for maximizing the differential restraining force of the differential mechanism 1C (command value 100%) to the differential adjusting mechanism 1CA (Step S31). Otherwise, the differential adjusting mechanism controller 85 outputs the control command for setting the differential restraining force at zero to the differential adjusting mechanism 1CA (control command 0%) (Step S35).

At this stage, when the inter-axle differential control is terminated at the same time as the termination of the TCS brake control, the differential restraining force between the wheels 4 suddenly disappears, which may cause a large slip of the wheel having a different friction coefficient relative to the road surface from those of the other wheels. In this case, the TCS control is restarted to stop the slip of this wheel and then terminated. However, such slip may be caused again and again. The occurrence of such a phenomenon causes a rapid reduction in the acceleration and annoys an operator. In view of the above, even after the TCS brake control is terminated, the inter-axle differential control is continued for a predetermined time, thereby preventing the occurrence of such a phenomenon.

With the above traction control device, the control-start determiner 82 determines whether or not to perform the TCS control while monitoring the rotation speed ratio ωee of the right and left wheels, the rotation speed difference ωlr of the right and left wheels, and the rotation speed difference ωfc of the front and rear wheels, so that it is possible to selectively determine: whether or not to perform the TCS brake control, which one of the wheels is to be subjected to the TCS brake control, and whether or not to perform the inter-axle differential control, in accordance with the slip conditions of the wheels. As a result, the driving force can be appropriately distributed to the wheels 4 in accordance with the conditions, so that the output of the engine 1A can be efficiently transmitted to the road surface without being wasted due to the slip of the wheels 4.

The control-start threshold and the target slip ratio (control target value) are separately calculated, so that a timing for starting the control can be changed without affecting the control command value during the TCS control. As a result, it is possible to increase the braking amount to enhance the acceleration while preventing the TCS from being prematurely started.

Further, with the above traction control device, when the target brake torque to each of the wheels 4 reaches or exceeds the pre-stored threshold thereof, the target brake torque is reduced. As a result, the brake torque of the TCS control acting on each of the wheels 4 is reduced, thereby preventing a reduction in the driving force resulting from excessive application of brake. Thus, a reduction in the acceleration during the travelling of the vehicle can be prevented.

The traction control device reduces the target brake torques to the wheels 4 by the same amount. In this case, the balance of the driving torque between the wheels 4 is not changed before and after the reduction in the target brake torques, so that the driving torque to one of the wheels 4 does not become outstandingly large or small. Thus, it is possible to prevent a reduction in the acceleration while ensuring the travelling stability and the course traceability.

Further, with the above traction control device, the brake torque of the TCS control is set in consideration of the traction force F corresponding to the friction force between each wheel and the road surface, so that the driving torque of each wheel is adjusted to an appropriate value for the road surface condition. The traction force F is modified based on the control deviation S of each wheel, so that even when the restraining torque acts on the differential adjusting mechanism to restrain the differential between the wheels or even when the friction force of each of the wheels 4 is changed due to a change in the road surface condition, the traction force F is maintained at an appropriate value. Thus, irrespective of the type of driving system and the road surface condition, it is possible to ensure sufficient acceleration and course traceability during the turning of the vehicle.

In the traction control device, the control condition determining section 844A for determining the control condition of the TCS control determines whether or not the counting of the TCS control starting timer has been started while determining whether or not the TCS brake control flags are set. In this exemplary embodiment, the TCS control starting timer starts counting when a relationship of rotation speed between the wheels 4 fulfills the TCS-start conditions, and the TCS brake control flag is set when the count of the TCS control starting timer exceeds the predetermined value. In other words, the TCS control starting timer starts counting upon occurrence of a slip, and the TCS brake control flag is set after the elapse of a certain period of filter time after the occurrence of the slip. Since whether or not the counting of the TCS control starting timer has been started is also included in the conditions for determination, the time of the occurrence of the slip can be accurately found. Thus, the traction force F can be initialized with a more accurate value obtained at the time of the occurrence of the slip, so that the accuracy of estimation of the traction force F can be enhanced.

Note that the scope of the invention is not limited to the above exemplary embodiment, but modifications or improvements are also included in the scope of the invention as long as an object of the invention can be achieved.

For instance, in the above exemplary embodiment, the target brake torques to the wheels 4 are converted into the target brake pressures, and the target brake pressures are used for determining whether or not the target brake torques reach or exceed the thresholds thereof, for selecting the reference wheel, and for reducing the target brake torques, but the invention is not limited thereto. Instead of that, for instance, the target brake torques may be directly used to perform these processes.

Specifically, the respective torque thresholds for the front wheels and the center wheels may be pre-stored in the memory 71 so as to determine whether or not the target brake torque to each of the wheel 4 reaches or exceeds the torque threshold thereof.

The reference wheel determining section 845C may select the wheel 4 having the smallest target brake torque as the reference wheel.

When the target brake torques to the wheels 4 reach or exceed the thresholds thereof, the target brake torque reducing section 845D may reduce the target brake torques to the wheels 4 in accordance with a difference between the target brake torque to the reference wheel and the threshold thereof.

In the above exemplary embodiment, the target brake pressures are used to determine whether or not the target brake torques reach or exceed the thresholds thereof, to select the reference wheel, and to reduce the target brake torques, but the invention is not limited thereto. Instead of that, for instance, measured brake pressures to the wheels 4 detected by the pressure sensors 616, 617, 626 and 627 may be used to perform these processes.

In the above exemplary embodiment, the different torque-cut gains between the front wheels 4 and the center wheels 4 are pre-stored, and the torque-cut gain for the front wheels is applied to the front wheels 4 while the torque-cut gain for the rear wheels is applied to the rear wheels 4, but the invention is not limited thereto. Instead of that, for instance, the same torque-cut gain for all the wheels may be pre-stored and is applied in common to the front wheels 4 and the center wheels 4 for calculating the reduction amount of the target brake torques. Alternatively, different torque-cut gains may be applied to the right and left front wheels, to the right and left rear wheels, or to the wheels 4.

In the above exemplary embodiment, the TCS brake control is performed on the front wheels 4 and center wheels 4 of the six driving wheels of the dump truck 1, but the invention is not limited thereto. Specifically, the control may be performed on relatively front and rear ones of the wheels 4, such as the front wheels 4 and the rear wheels 4 of the dump truck 1, or the front wheels 4, the center wheels 4 and the rear wheels 4 of the dump truck 1.

In the above exemplary embodiment, the rotation speeds of the wheels to be controlled (i.e., the front wheels 4 and the center wheels 4) are detected, but the invention is not limited thereto. Instead of that, the rotation speeds of all the wheels 4 may be detected. As a result, since the rotation speeds of a larger number of wheels 4 are detected, when the vehicle speed V is estimated, the accuracy of the vehicle speed V can be improved. For estimating the vehicle speed V, an acceleration sensor may be provided in addition to the rotation speed sensors 43FL, 43FR, 43CL and 43CR so as to estimate the vehicle speed V based on rotation speed values obtained from the rotation speed sensors 43FL, 43FR, 43CL and 43CR and an acceleration value obtained from the acceleration sensor.

In the above exemplary embodiment, the vehicle speed is estimated based on the rotation speeds ωfl, ωfr, ωcl and ωcr of the wheels 4, but the invention is not limited thereto. Instead of that, for instance, the vehicle speed V may be acquired from a ground speed sensor or may be calculated by using GPS information.

Although the TCS brake control and the inter-axle differential control are performed as the TCS control in the above exemplary embodiment, only the TCS brake control may be performed. Further, in addition to the TCS brake control, an engine output control may also be performed. In this case, when the original engine output is too high for the road surface condition, the slip amounts of the wheels 4 can be reduced by reducing the engine output. Thus, it is possible to reduce the brake load during the TCS brake control while smoothly performing the control.

In the above exemplary embodiment, the traction force modifying section 844C modifies the traction force F in accordance with the amount of the control deviation S by using the value of the former calculation cycle, but the invention is not limited thereto. Instead of that, for instance, the traction force initial value setting section 844B acquires the input driving forces Fin1 and Fin2, which are obtained by the equations (7) and (8), every calculation cycle, so that the traction force modifying section 844C may always modify the traction force F in accordance with the control deviation S by using the acquired input driving force Fin1 or input driving force Fin2. For an example of such modification of the traction force F, the following equations (19) and (20) are used (G1 and G2 are coefficients).

Equation 19

$$F = Fin1 + G1 \cdot S \quad (19)$$

Equation 20

$$F = Fin2 + G2 \cdot S \quad (20)$$

In the above exemplary embodiment, in order to estimate the traction force F, the control condition determining section 844A of the traction force estimating section 844 determines the control condition of the TCS control depending on whether or not the front TCS brake control flag and the center TCS brake control flag are set and whether or not the counting of the TCS control starting timer has been started, but the invention is not limited thereto. In the above exemplary embodiment, the brake torque provided by the TCS brake control is gradually reduced immediately after the TCS brake control flag is switched from being set to being reset. In such a case, for instance, the control condition determining section 844A may determine the control condition in consideration of the brake torque reduced condition at the time of the termination of the control in addition to the TCS brake control flag and the TCS control starting timer. As a result, it is possible to eliminate the influence of the brake torque that is continuously applied even after the termination of the TCS control is determined, so that the traction force F can be more accurately estimated.

In the above exemplary embodiment, the differential adjusting mechanism controller 85 controls the differential restraining force between the front and rear wheels via the differential adjusting mechanism 1CA during the TCS control, but the invention is not limited thereto. Instead of that, for instance, differential adjusting mechanisms may provided to the differential mechanisms 1D and 1E between the right and left wheels to allow the differential adjusting mechanism controller 85 to control the differential restraining force between the right and left wheels. Even in such a case, the above effects of the invention may also be attained.

In the above exemplary embodiment, the differential restraining force of the differential mechanism 1C is maximized (command amount 100%) or set at zero (command amount 0%) in accordance with the determination result of the control-start determiner 82 during the inter-axle differential control, but the invention is not limited thereto. Instead of that, for instance, the differential restraining force may be linearly changed in accordance with the control deviation S.

In the above exemplary embodiment, the invention is applied to the articulated dump truck 1, but the invention is not limited thereto. For instance, the invention may be applied to a wheel-steering dump truck or any other construction machine. In the case of the wheel-steering machine, while the control-start threshold and the target slip ratio cannot be set in consideration of an articulate angle, an inner-outer-wheel speed difference is generally small as compared with an articulated machine. In view of the above, a slightly-high control-start threshold is pre-stored, thereby absorbing an influence on the timing for starting the TCS control.

The invention claimed is:

1. A traction control device of a construction machine comprising a braking mechanism provided to each of wheels, the traction control device controlling the braking mechanism, the traction control device comprising:
    a rotation speed detector that detects a rotation speed of each of the wheels;
    a vehicle speed estimator that estimates a vehicle speed of the construction machine; and
    a braking mechanism controller that controls the braking mechanism, wherein the braking mechanism controller comprises:
        a control deviation calculating section that calculates a control deviation based on the rotation speed and the vehicle speed;
        a target brake torque calculating section that calculates a target brake torque applied to each of the wheels by the braking mechanism based on the control deviation;
        a target brake torque determining section that determines whether or not the target brake torque reaches or exceeds a pre-stored threshold;
        a reference wheel determining section that selects a reference wheel used as a reference for controlling the braking mechanism based on the target brake torque to each of the wheels; and
        a target brake torque reducing section that reduces the target brake torque in accordance with a difference between the target brake torque to the reference wheel and the threshold when the target brake torque to one of the wheels reaches or exceeds the threshold.

2. The traction control device according to claim 1, wherein
    the reference wheel determining section selects one of the wheels having a smallest target brake torque as the reference wheel.

3. The traction control device according to claim 1, wherein
    the threshold comprises a front-wheel threshold and a rear-wheel threshold of the target brake torques,
    the target brake torque determining section determines whether or not the target brake torques to both front ones of the wheels reach or exceed the front-wheel threshold and whether or not the target brake torques to both rear ones of the wheels reach or exceed the rear-wheel threshold, and
    the target brake torque reducing section reduces the target brake torques in accordance with a difference between the target brake torque to the reference wheel and the front-wheel threshold when the reference wheel is one of the front wheels and reduces the target brake torques in accordance with a difference between the target brake torque to the reference wheel and the rear-wheel threshold when the reference wheel is one of the rear wheels.

4. The traction control device according to claim 1, wherein
    the braking mechanism controller further comprises a traction force estimating section that estimates a traction force between each of the wheels and a road surface based on the control deviation, and
    the target brake torque calculating section calculates the target brake torque to each of the wheels by using the estimated traction force.

* * * * *